United States Patent
Zhang et al.

(10) Patent No.: US 12,004,001 B2
(45) Date of Patent: Jun. 4, 2024

(54) METHOD AND SYSTEM FOR EXCHANGING INFORMATION FOR SIDELINK COMMUNICATION IN A WIRELESS NETWORK

(71) Applicant: Telefonaktiebolaget LM Ericsson (publ), Stockholm (SE)

(72) Inventors: Zhang Zhang, Beijing (CN); Marco Belleschi, Solna (SE); Liang Hu, Stockholm (SE); Jingya Li, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/263,311

(22) PCT Filed: Aug. 7, 2019

(86) PCT No.: PCT/CN2019/099634
§ 371 (c)(1),
(2) Date: Jan. 26, 2021

(87) PCT Pub. No.: WO2020/030007
PCT Pub. Date: Feb. 13, 2020

(65) Prior Publication Data
US 2021/0153062 A1    May 20, 2021

(51) Int. Cl.
*H04W 28/02* (2009.01)
*H04W 4/40* (2018.01)

(52) U.S. Cl.
CPC .......... *H04W 28/0231* (2013.01); *H04W 4/40* (2018.02)

(58) Field of Classification Search
CPC .......... H04W 28/0231; H04W 72/048; H04W 4/40–48; H04W 76/14
See application file for complete search history.

(56) References Cited

U.S. PATENT DOCUMENTS

2011/0268000 A1* 11/2011 Kashikar .......... H04W 52/0264
713/340
2018/0206140 A1    7/2018 Panteleev et al.
(Continued)

FOREIGN PATENT DOCUMENTS

WO    2014031829 A2    2/2014
WO    2014031829 A3    4/2014
(Continued)

OTHER PUBLICATIONS

3GPP, "3GPP TR 22.886 V15.1.0", 3rd Generation Partnership Project; Technical Specification Group Services and System Aspects; Study on enhancement of 3GPP Support for 5G V2X Services (Release 15), Mar. 2017, pp. 1-78.
(Continued)

*Primary Examiner* — Robert C Scheibel
(74) *Attorney, Agent, or Firm* — Murphy, Bilak & Homiller, PLLC

(57) ABSTRACT

Embodiments of the present disclosure provide a method implemented in a terminal device for sidelink communication in a wireless network. The method comprises receiving (702), by the terminal device, a message containing sidelink performance information of a sidelink. The sidelink is for communication between the terminal device and another terminal device. A value within the message indicates that the message contains the sidelink performance information. The method also comprises performing (704) a sidelink procedure based on the sidelink performance information and characteristics of the terminal device to communicate through the sidelink.

6 Claims, 19 Drawing Sheets

(56) References Cited

U.S. PATENT DOCUMENTS

| | | | |
|---|---|---|---|
| 2019/0075430 A1* | 3/2019 | Lincoln | H04W 24/10 |
| 2019/0104525 A1* | 4/2019 | Santhanam | H04W 72/02 |
| 2019/0174530 A1* | 6/2019 | Kim | H04L 1/0003 |
| 2020/0344643 A1* | 10/2020 | Zhou | H04W 28/0231 |
| 2020/0413235 A1* | 12/2020 | Pateromichelakis | H04W 28/0268 |
| 2021/0160817 A1* | 5/2021 | Khoryaev | H04W 76/14 |
| 2021/0242960 A1* | 8/2021 | Li | H04W 64/003 |
| 2021/0243837 A1* | 8/2021 | Jung | H04W 76/14 |
| 2021/0266994 A1* | 8/2021 | Li | H04L 1/0003 |

FOREIGN PATENT DOCUMENTS

| | | |
|---|---|---|
| WO | 2017051330 A1 | 3/2017 |
| WO | 2017111316 A1 | 6/2017 |
| WO | 2017134235 A1 | 8/2017 |
| WO | 2017158515 A1 | 9/2017 |

OTHER PUBLICATIONS

3GPP, "3GPP TS 23.303 V15.0.0", 3rd Generation Partnership Project; Technical Specification Group Services and System Aspects; Proximity-based services (ProSe); Stage 2 (Release 15), Jun. 2017, pp. 1-130.

3GPP, "3GPP TS 36.321 V14.2.1", 3rd Generation Partnership Project; Technical Specification Group Radio Access Network; Evolved Universal Terrestrial Radio Access (E-UTRA); Medium Access Control (MAC) protocol specification (Release 14), Mar. 2017, pp. 1-151.

ETSI, "ETSI EN 302 636-4-1 V1.2.0", Intelligent Transport Systems (ITS); Vehicular Communications; GeoNetworking; Part 4: Geographical addressing and forwarding for point-to-point and point-to-multipoint communications; Sub-part 1: Media-Independent Functionality, Oct. 2013, pp. 1-102.

ETSI, "ETSI EN 302 637-2 V1.3.2", Intelligent Transport Systems (ITS); Vehicular Communications; Basic Set of Applications; Part 2: Specification of Cooperative Awareness Basic Service, Nov. 2014, pp. 1-44.

ETSI , "Evolved Universal Terrestrial Radio Access (E-UTRA); Medium Access Control (MAC) protocol specification", ETSI TS 136 321 V14.3.0 (3GPP TS 36.321 version 14.3.0 Release 14), Jul. 2017, pp. 1-109.

"Clean up of Rear", 3GPP TSG-SA WG1 #79, S1-173295, LG Electronics, Guilin, China, Aug. 21-25, 2017, 10 pages.

Qualcomm Incorporated , "Coexistence between Rel-14 and Rel-15 V2X UEs", 3GPP TSG RAN WG2 Meeting #100, R2-1713407, Reno, USA, Nov. 27-Dec. 1, 2017, pp. 1-3.

* cited by examiner

| Sidelink (SL) Performance Info Types | Parameters | Parameter values |
|---|---|---|
| Sidelink (SL) capabilities 302 | RAT support | Value Sets |
| | MIMO/MCS Scheme | Value Sets |
| | Carrier Aggregation Scheme | Value Sets |
| | Bands for the SL | Value Sets |
| | Band combinations for simultaneous SL | Value Sets |
| | ⋮ | ⋮ |
| QoS requirements for services 304 | QoS requirements for V2X service 1 | Value Sets |
| | QoS requirements for V2X service 2 | Value Sets |
| | ⋮ | ⋮ |
| Radio Conditions 306 | Traffic load | Value Sets |
| | Interference levels | Value Sets |
| | Signal strength/quality measurements | Value Sets |
| | ⋮ | ⋮ |

FIG. 3

METHOD AND SYSTEM FOR EXCHANGING INFORMATION FOR SIDELINK COMMUNICATION IN A WIRELESS NETWORK

CROSS-REFERENCE TO RELATED APPLICATIONS

This application claims priority to International Patent Application No. PCT/CN2018/099554, filed on Aug. 9, 2018, entitled "METHOD AND SYSTEM FOR EXCHANGING INFORMATION FOR SIDELINK COMMUNICATION IN A WIRELESS NETWORK," which is incorporated by reference herein in its entirety for all purposes.

TECHNICAL FIELD

Embodiments of the disclosure relate to the field of wireless communications, and more specifically, relate to methods, systems, and computer programs to exchange information for sidelink communication in a wireless communication network.

BACKGROUND

A wireless network may support vehicle-to-everything (V2X) communication. The V2X communication passes information between a vehicle to any entity that may affect the vehicle, including V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid). V2X communication includes any combination of direct communication between vehicles, and between vehicles and pedestrians or infrastructure. V2X communication technology may be cellular based or wireless local area network (WLAN) based (e.g., based on IEEE 802.11p standards). The former is generally referred to as cellular V2X (C-V2X).

In C-V2X and similar scenarios that involve device-to-device (D2D) communications, sidelink is implemented to support the D2D communications without going through a network device such as a base station. Yet, the current implementations do not consider radio conditions in which the sidelink communications are to be performed. For example, the device discovery and communication channel establishment in D2D communications are based on the upper layer service requests, while the physical layer characteristics are not taken into consideration. When the physical layer characteristics are not sufficient to support the sidelink communication, the resources dedicated to the communication are wasted.

SUMMARY

Embodiments of the disclosure offer efficient ways to estimate the achievable sidelink performance based on local radio conditions and the radio sidelink capabilities of a terminal device itself and terminal devices in its vicinity. Embodiments of the disclosure further determine and indicate the configurations that may be used for sidelink communication based on radio characteristics of the channel through which the sidelink communication is performed. Additionally, embodiments of the disclosure set specific values in packet headers to designate the corresponding packets to be used for transmitting radio sidelink capabilities and/or quality of service requirements. Furthermore, embodiments of the disclosure configure and/or pre-configure the adaptation rules and the related parameters to adapt sidelink discovery and/or link establishment.

Embodiments of the disclosure allow sidelink discovery and/or link establishment to be performed in a more robust manner thus reducing the latency and improving the V2X service performance. Additionally, embodiments of the disclosure avoid unnecessary execution of sidelink discovery and/or link establishment thus mitigating unnecessary resource consumption. Moreover, embodiments of the disclosure handle the sidelink communication more properly by coordinating sidelink radio capabilities between terminal devices.

Embodiments of the disclosure include methods to exchange information for sidelink communication in a wireless communication network. In one embodiment, a first terminal device receives a message containing sidelink performance information of a sidelink, where the sidelink is for communication between the first terminal device and a second terminal device, and where a value within the message indicates that the message contains the sidelink performance information. The first terminal device then performs a sidelink procedure based on the sidelink performance information and characteristics of the first terminal device to communicate through the sidelink.

In an embodiment of the present disclosure, wherein the sidelink performance information may include one or more of: a set of terminal device sidelink capabilities; a set of quality of service requirements for vehicle-to-everything (V2X) services; and a set of radio conditions.

In another embodiment of the present disclosure, the value may be multiplexed into a radio bearer, and the radio bearer may be a data or signaling bearer.

In yet another embodiment, the value may be indicated in a logical channel identifier (ID) in a media access control (MAC) sub-header of a MAC control element (CE).

In yet another embodiment, the value may be indicated in a destination field in a media access control (MAC) sub-header of a MAC control element (CE).

In yet another embodiment, the value may be indicated in a "V" field in a media access control (MAC) sub-header of a MAC control element (CE).

In yet another embodiment, the value may be indicated in a message header in a cooperative awareness message (CAM).

In yet another embodiment, the value may be indicated in a radio resource control message header.

In yet another embodiment, the message may be a sidelink beacon packet.

In yet another embodiment, the sidelink procedure may be performed by determining an achievable performance of the sidelink based on the sidelink performance information and characteristics of the terminal device to communicate through the sidelink, and suspending or increasing periodicity of transmission of a discovery message for a vehicle-to-everything (V2X) service when the terminal device is determined to have a low probability to meet a quality of service requirement of the V2X service with a set of terminal devices within a range or distance.

In yet another embodiment, the sidelink procedure may be performed by determining an achievable performance of the sidelink based on the sidelink performance information and characteristics of the terminal device to communicate through the sidelink, and decreasing periodicity of transmission of a discovery message for a vehicle-to-everything (V2X) service when the terminal device is determined to have a high probability to meet a quality of service requirement of the V2X service with a set of terminal devices within a range or distance.

In yet another embodiment, the sidelink procedure may be performed by determining an achievable performance of the sidelink based on the sidelink performance information and characteristics of the terminal device to communicate through the sidelink, and suspending or postponing transmission of a discovery response for a vehicle-to-everything (V2X) service when the terminal device is determined to have a low probability to meet a quality of service requirement of the V2X service, or out of a range for peer terminal device transmitting discovery request.

In yet another embodiment, the sidelink procedure may be performed by determining an achievable performance of the sidelink based on the sidelink performance information and characteristics of the terminal device to communicate through the sidelink, and transmitting a discovery response for a vehicle-to-everything (V2X) service, wherein the response includes an indication of a likelihood that a quality of service requirement of the V2X service can be met.

In yet another embodiment, the sidelink procedure may be performed by determining an achievable performance of the sidelink based on the sidelink performance information and characteristics of the terminal device to communicate through the sidelink, and adjusting a priority of a discovery transmission based on a determination of a likelihood that a quality of service requirement of a vehicle-to-everything (V2X) service can be met.

In yet another embodiment, the sidelink procedure may be performed by determining an achievable performance of the sidelink based on the sidelink performance information and characteristics of the terminal device to communicate through the sidelink, and prioritizing a sidelink establishment between the terminal device and a first neighboring terminal device over one between the terminal device and a second neighboring terminal based on at least one of a first distance between the terminal device and the first neighboring terminal device, and a second distance between the terminal device and the second neighboring terminal device.

In yet another embodiment, the sidelink procedure may be performed by determining an achievable performance of the sidelink based on the sidelink performance information and characteristics of the terminal device to communicate through the sidelink, and prioritizing a sidelink establishment between the terminal device and a first neighboring terminal device over one between the terminal device and a second neighboring terminal based on criticality of the sidelink establishments.

In yet another embodiment, the sidelink procedure may be performed by determining an achievable performance of the sidelink based on the sidelink performance information and characteristics of the terminal device to communicate through the sidelink, and suspending or postponing a sidelink establishment between the terminal device and a neighboring terminal device if, for a set of vehicle-to-everything (V2X) services that are interested by the terminal device and the neighboring terminal device, a distance between the terminal device and the neighboring terminal device is over a threshold.

In yet another embodiment, the sidelink procedure may be performed by determining an achievable performance of the sidelink based on the sidelink performance information and characteristics of the terminal device to communicate through the sidelink, and suspending or postponing a sidelink establishment between the terminal device and a neighboring terminal device if, for a set of vehicle-to-everything (V2X) services that are interested by the terminal device and the neighboring terminal device, a likelihood that a quality of service requirement of the set of V2X services can be met is lower than a threshold.

In yet another embodiment, the sidelink procedure may be performed by determining an achievable performance of the sidelink based on the sidelink performance information and characteristics of the terminal device to communicate through the sidelink, and releasing a sidelink between the terminal device and a neighboring terminal device if, for a set of vehicle-to-everything (V2X) services that are interested by the terminal device and the neighboring terminal device, a distance between the terminal device and the neighboring terminal device is over a threshold.

In yet another embodiment, the sidelink procedure may be performed by determining an achievable performance of the sidelink based on the sidelink performance information and characteristics of the terminal device to communicate through the sidelink, and releasing a sidelink between the terminal device and a neighboring terminal device if, for a set of vehicle-to-everything (V2X) services that are interested by the terminal device and the neighboring terminal device, a duration that a quality of service requirement of the set of V2X services is failed to meet is over a threshold.

In yet another embodiment, the sidelink procedure may be performed by determining that the sidelink can be established based on the sidelink performance information and characteristics of the terminal device to communicate through the sidelink, and transmitting an indication to the second terminal device that the sidelink can be established.

In yet another embodiment, the determination may be based on a comparison between: a set of terminal device sidelink capabilities received from the message and a set of terminal device sidelink capabilities of the first terminal device.

In yet another embodiment, the comparison may indicate at least a partial match of: the set of terminal device sidelink capabilities received from the message and the set of terminal device sidelink capabilities of the first terminal device.

In yet another embodiment, the indication may be sent in a media access control (MAC) control element (CE) or a radio resource control (RRC) message.

In yet another embodiment, the sidelink procedure may be performed by determining whether the sidelink can be established based on the sidelink performance information and characteristics of the terminal device to communicate through the sidelink, and sending a set of terminal device sidelink capabilities of the first terminal device to the second terminal device.

In yet another embodiment, the sidelink procedure may be performed by comparing a set of terminal device sidelink capabilities received from the message and a set of terminal device sidelink capabilities of the first terminal device, and determining whether to set up a unicast connection between the first and second terminal devices based on the comparison.

In yet another embodiment, the determination is to set up the unicast connection, and the method may further comprise transmitting an indication to a layer above a media access control (MAC) layer to set up the unicast connection.

In yet another embodiment, the indication may include an address of the second terminal device.

In yet another embodiment, the layer above the media access control (MAC) layer may communicate with a corresponding layer of the second terminal device for setting up the unicast connection.

In yet another embodiment, the indication may further include a subset of terminal device sidelink capabilities to be used to set up the unicast connection.

In yet another embodiment, the sidelink procedure may be performed by examining a set of quality of service requirements for vehicle-to-everything (V2X) services received from the message and a set of radio conditions of the first terminal device, and determining whether to set up a unicast connection between the first and second terminal devices based on the examination.

In yet another embodiment, the set of radio conditions may include at least one of: an interference level, a congestion level, a block error rate (BLER), a bit rate of the sidelink, a latency of the sidelink.

In yet another embodiment, the examination may further include examination of the capability of the first terminal device to communicate through the sidelink.

Embodiments of the disclosure include terminal devices to exchange information for sidelink communication in a wireless communication network. In one embodiment, a terminal device comprises a processor to perform one or more methods of the embodiments of the disclosure.

Embodiments of the disclosure include computer-readable storage media that provide instructions (e.g., computer program) that, when executed by a processor, cause the processor to perform operations comprising one or more methods of the embodiments of the disclosure.

BRIEF DESCRIPTION OF THE DRAWINGS

The disclosure may best be understood by referring to the following description and accompanying drawings that illustrate embodiments of the disclosure. In the drawings:

FIG. 3 shows parameters of sidelink performance information per one embodiment of the disclosure.

DETAILED DESCRIPTION

Figure 1A:
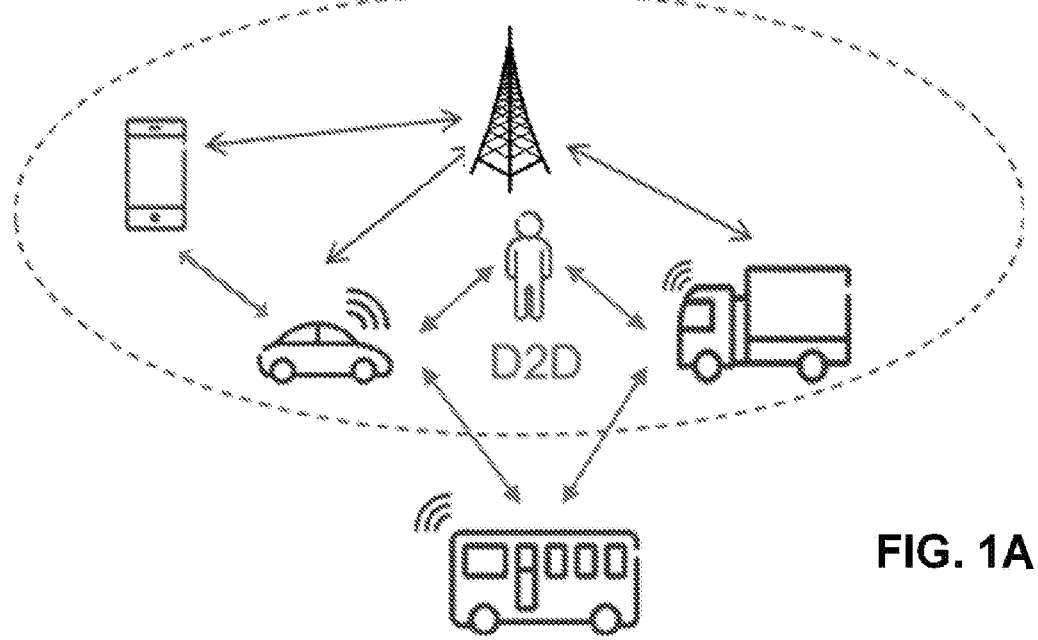
FIG. 1A shows a device-to-device (D2D) system in a wireless network per one embodiment of the disclosure.

The following description describes methods, apparatus, and computer programs to exchange information for sidelink communication in a wireless communication network. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the disclosure may be practiced without such specific details. In other instances, control structures, gate level circuits and full software instruction sequences have not been shown in detail in order not to obscure the disclosure. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the disclosure. Such notation, however, should not be taken to mean that these are the only options or optional operations, and/or that blocks with solid borders are not optional in some embodiments of the disclosure.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the disclosure may be implemented using different combinations of software, firmware, and/or hardware.

A wireless communication network is a network of devices communicating using radio waves (electromagnetic waves within the frequencies 30 KHz-300 GHz). A wireless communication may follow wireless communication standards, such as new radio (NR), LTE (Long-Term Evolution), LTE-Advanced (LTE-A), wideband code division multiple access (WCDMA), High-Speed Packet Access (HSPA). Furthermore, the communications between the devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the disclosure, the disclosure may apply to other wireless communication networks, including LTE operating in unlicensed spectrums, Multefire system, IEEE 802.11 systems. While LTE-based systems are used as examples in this disclosure, embodiments of the disclosure apply to other wireless communication networks as well.

A network device (ND) (also referred to as a network node or node, these terms are used interchangeably in this disclosure unless noted otherwise) is a communication device in a wireless communication network via which a terminal device accesses the network and receives services therefrom. One type of network device may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station (SS), a portable subscriber station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box. In vehicle-to-everything (V2X) communications, the vehicle is typically a terminal device, and the pedestrian in V2P (Vehicle-to-Pedestrian), and the device in V2D (Vehicle-to-device) are typically communicated through terminal devices as well. Note that while UEs are used as examples of terminal devices in this disclosure, embodiments of the disclosure apply to other terminal devices as well.

Sidelink Communication in a Wireless Network

Vehicle-to-everything (V2X) communication includes any combination of direct communication between vehicles, and between vehicles and pedestrians or infrastructure. V2X communication may take advantage of a network infrastructure when available, but even when coverage is lacking, at least basic V2X connectivity should be possible. Providing a V2X interface to a wireless network (e.g., in a LTE or 5G networks) may be economically advantageous because of the wireless network's economies of scale, which may enable tighter integration between communications through V2I (Vehicle-to-Infrastructure), V2N (Vehicle-to-Network), V2V (Vehicle-to-Vehicle), V2P (Vehicle-to-Pedestrian), V2D (Vehicle-to-Device) and V2G (Vehicle-to-Grid) communications, as compared to using a dedicated V2X technology.

FIG. 1A shows a device-to-device (D2D) system in a wireless network per one embodiment of the disclosure. Note that a variety of V2X communications are shown in this example. V2X communications may carry both non-safety and safety information, where each of the applications and services may be associated with specific requirements sets, e.g., in terms of latency, reliability, capacity, etc.

Figure 1B:
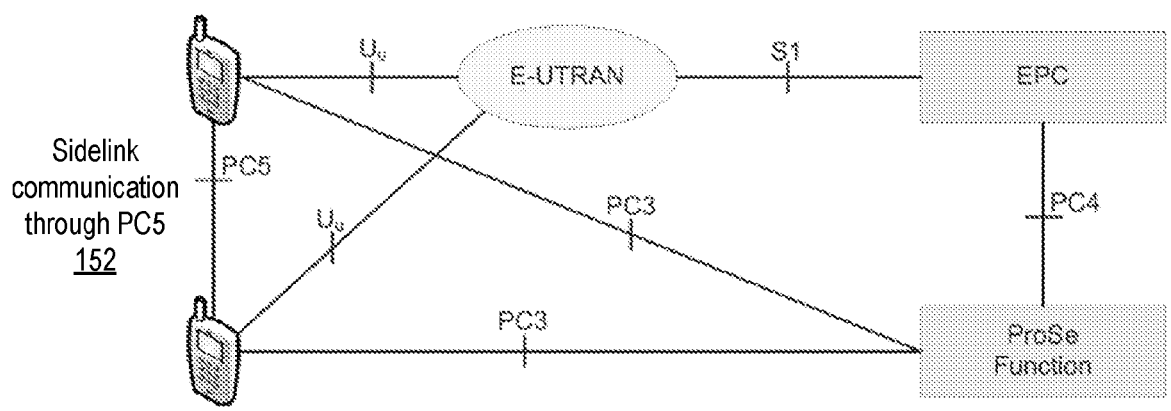
FIG. 1B shows various interfaces supporting V2X communications per one embodiment of the disclosure.

FIG. 1B shows various interfaces supporting V2X communications per one embodiment of the disclosure. For example, V2V (vehicle-to-vehicle) covers LTE-based communication between vehicles, either via Uu or sidelink. The sidelink communication through PC5 is at reference 152. V2P (vehicle-to-pedestrian) covers LTE-based communication between a vehicle and a device carried by an individual (e.g., handheld terminal carried by a pedestrian, cyclist, driver or passenger), either via Uu or sidelink (PC5). V2I/N (vehicle-to-infrastructure/network) covers LTE-based communication between a vehicle and a roadside unit/network. A roadside unit (RSU) is a transportation infrastructure entity (e.g., an entity transmitting speed notifications) that communicates with V2X capable UEs over sidelink (PC5). For V2N the communication is performed on Uu.

Figure 2A:
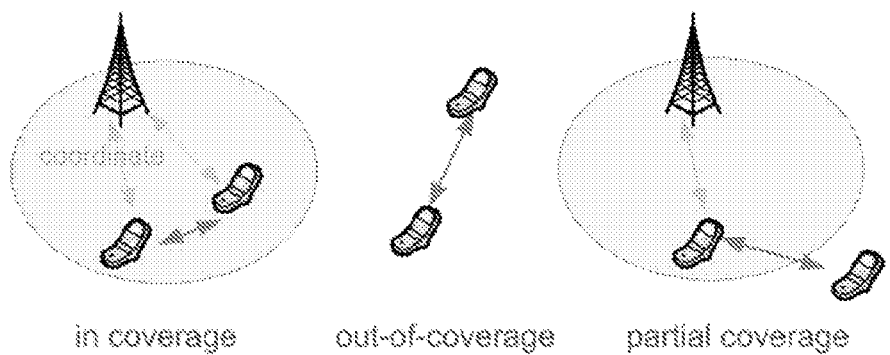
FIG. 2A shows a first scenario where both UEs are within the coverage of a wireless network ("in coverage"), a second scenario where both UEs are outside the coverage ("out-of-coverage"), and a third scenario wherein one User Equipment (UE) is within and one is outside the coverage ("partial coverage").

V2X communications may apply to different network coverage scenarios. FIG. 2A shows a first scenario where both UEs are within the coverage of a wireless network ("in coverage"), a second scenario where both UEs are outside the coverage ("out-of-coverage"), and a third scenario wherein one UE is within and one is outside the coverage ("partial coverage"). In these scenarios, UEs may perform sidelink discovery and sidelink establishment.

Sidelink Discovery

Sidelink communication includes a ProSe (proximity service) Discovery procedure. In ProSe Discovery, UEs transmit and monitor discovery announcement to become aware of the type of content/service each UE can share in D2D fashion, as well as the proximity between each other. Such procedure can be used for subsequent actions, e.g., to initiate direct (unicast) link communication (i.e., sidelink establishment) or towards a group of UEs (multicast).

Two ProSe Direct Discovery Models (e.g., as discussed in the Third Generation Partnership Project (3GPP) standards) are known as the following:

(1) Model A ("I am here"): this model defines two roles for the ProSe-enabled UEs that are participating in ProSe Direct Discovery. One role is an announcing UE, which announces certain information that could be used by UEs in proximity that have permission to discover. The other is a monitoring UE, which monitors certain information of interest in proximity of announcing UEs. In this model the announcing UE broadcasts discovery messages; and the monitoring UEs that are interested in these messages read them and process them.

(2) Model B ("who is there?"/"are you there?"): This model also defines two roles for the ProSe-enabled UEs that are participating in ProSe Direct Discovery. One role is a discoverer UE, which transmits a request containing certain information about what it is interested to discover. The other is a discoveree UE, which receives the request message and can respond with some information related to the discoverer's request. This model is similar to "who is there/are you there" since the discoverer UE sends information about other UEs, from which the discoverer UE would like to receive responses, e.g., the information can be about a ProSe Application Identity corresponding to a group and the members of the group that can respond.

Figure 2B:
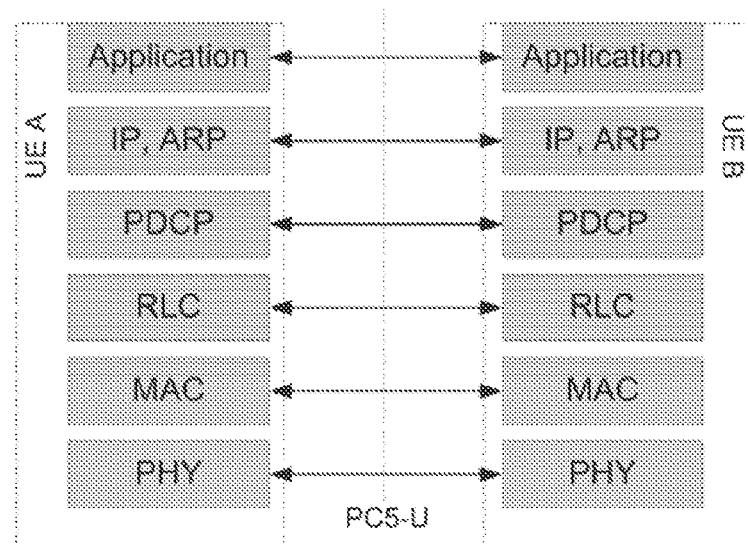
FIG. 2B shows the protocol layers for sidelink communications per one embodiment of the disclosure.

Sidelink discovery involves various layers of the protocol layers that a terminal device such as a UE may use for sidelink communications. FIG. 2B shows the protocol layers for sidelink communications per one embodiment of the disclosure. The protocol layers include a physical layer ("PHY"), a media access control layer ("MAC"), a radio link control layer ("RLC"), a packet data convergence protocol (PDCP) layer, an Internet Protocol (IP) and Allocation Retention Priority (ARP) layer, and an application layer.

At the physical layer, discovery transmissions are carried out on a specific set of periodic time-frequency resources that are configured by the eNB in broadcast fashion (i.e., in system information block (SIB)19) or in dedicated RRC signaling for UEs in connected mode. To ensure out-of-coverage operations, discovery resources can also be pre-configured in the UE when there is no network coverage.

At the MAC layer, discovery transmissions are delivered on a dedicated discovery channel (e.g., Sidelink Discovery Channel (SL-DCH), which is conveyed in a transparent MAC PDU (e.g., the discovery MAC PDU), which consists solely of a MAC SDU with no MAC header.

The involvement of the upper layers for sidelink communications are discussed herein below.

Sidelink Establishment

Establishment of direct communication paths between two or more ProSe-enabled terminal devices such as UEs are needed for unicast/multicast based direct communication. During the link establishment procedure, UEs are engaged in isolated (non-relay) one-to-one communication to negotiate IP address allocation mechanisms and optionally exchange link-local IPv6 addresses if needed. Note that mutual authentication is performed during the link establishment procedure if a secure layer-2 link is required to be established over the sidelink.

Sidelink Shared Channel (SL-SCH)

SL-SCH is used to carry sidelink data transmission. Currently a SL-SCH MAC header is of a variable size and include the following fields:

V field: The MAC PDU format version number field indicates which version of the SL-SCH sub-header (or "subheader," the two terms are used interchangeably in this disclosure) is used. Currently the field is used to indicate whether unicast, groupcast, or broadcast transmission is performed over a sidelink.

Source (SRC) field: The Source Layer-2 ID field carries the identity of the source. It is set to the ProSe UE ID. The SRC field size is 24 bits in one embodiment.

Destination (DST) field: The DST field can be 16 bits or 24 bits in some embodiments. If it is 16 bits, it carries the 16 most significant bits of the Destination Layer-2 ID; and if it is 24 bits, it is set to the Destination Layer-2 ID in these embodiments.

Logical Channel Identity (LCID) field: The Logical Channel ID field uniquely identifies the logical channel instance within the scope of one Source Layer-2 ID and Destination Layer-2 ID pair of the corresponding MAC SDU or padding.

L field: The Length field indicates the length of the corresponding MAC SDU in bytes.

F field: The Format field indicates the size of the Length field.

E field: The Extension field is a flag indicating if more fields are present in the MAC header or not.

R field: Reserved bit, set to zero.

Peer Detection

Information distributed by Cooperative Awareness Message (CAM) is commonly used by some (safety related) services (e.g., Approaching Emergency Vehicle, Slow Vehicle Warning, etc.) By receiving CAMs, a V2X device is aware of other device(s) in its neighborhood area as well as their positions, speed (both velocity and direction), basic attributes, and basic sensor information. A receiving device (e.g., a terminal device) may take reasonable efforts to evaluate the relevance of the messages and the information, and then respond accordingly. This allows the V2X device to get information about its situation and act accordingly.

UEs may advertise their presence with periodic beacon transmissions. Each beacon includes a set of possible information such as the address of the sender, the intelligent transport system (ITS) station type (e.g., pedestrian, bike, car, truck, etc.), speed, location, etc. The information is similar to the CAM message. By receiving such beacons, each receiving terminal device may build up a table of neighbors and their related characteristics.

V2X Use Cases

3GPP SA1 working group has completed new service requirements for future V2X services. For advanced V2X services, SA1 have identified 25 use cases that will be used in LTE and NR (e.g., 5G). Such use cases are categorized into four use case groups: vehicles platooning, extended sensors, advanced driving, and remote driving. The consolidated requirements for each use case group are captured in TR 22.886. Direct unicast/multicast transmission over sidelink will be needed in some use cases such as platooning, cooperative driving, dynamic ride sharing, etc., in which cases discovery and/or link establishment will be needed.

Inefficiency of Resource Usage and Improvement

Existing implementation of V2X technologies do not consider radio conditions in discovery and peer detection procedure. A unicast/multicast link connection is performed based on factors such as service of interests, ITS station type, etc., while the physical layer characteristics are not taken into account. When the sidelink performance is insufficient to support the V2X service(s), the UEs are still far from each other, and/or the UE radio capabilities are incompatible between transmitting and receiving UEs (e.g., transceivers of the two UEs being incompatible), (frequently) performing discovery and establishing the sidelink are basically a waste of resources as the actual communication for the V2X service cannot be performed properly, or not really needed to be performed.

Embodiments of the disclosure may overcome the inefficiency of resource usage. In one embodiment, the achievable sidelink performance is estimated based on the local (radio) conditions and the (radio) sidelink capabilities of a UE itself and the UEs in its vicinity. In one embodiment, special logical channel ID(s) and/or special values for DST field/V field in SL-SCH MAC header may be (pre)configured for transmitting sidelink capabilities (e.g., radio sidelink capabilities) and/or QoS requirements as detailed in this disclosure.

In one embodiment, the adaptation rules and the related parameters to adapt sidelink discovery and/or link establishment may be configured or preconfigured. For example, the adaptation may be based on the estimated achievable sidelink performance, the QoS requirement, and/or the positions/speed information (obtained from CAM). Additionally, sidelink discovery and/or link establishment could be adapted through adjusting the transmission periodicity and/or the priority. Furthermore, an already established link could be released if not needed anymore.

In one embodiment, the configurations that can/should be used for sidelink communication may be determined and indicated based on the radio characteristics.

The local conditions, radio conditions, QoS requirements, sidelink capabilities of a terminal device may be collectively referred to as sidelink performance information, which is used to improve sidelink communication efficiency.

Sidelink Performance Information

Sidelink performance information may cover a variety of information usable for sidelink communications. FIG. 3 shows parameters of sidelink performance information per one embodiment of the disclosure.

One type of sidelink performance information is sidelink capabilities 302 of a terminal device. The sidelink capabilities may include radio access technologies (RATs) such as LTE, NR, and a specific 3GPP release version. They may also include the supported multiple-input and multiple-output (MIMO) schemes and modulation and coding scheme (MCS). They may additionally include the supported carrier aggregation (CA) scheme, bands in which SL receiving/transmitting operations can be performed, band combinations in which simultaneous RX/TX can be performed, etc.

Another type of sidelink performance information is quality of service (QoS) requirements for services (e.g., V2X services) at reference 304. A terminal device may support a variety of services, and each may have a QoS requirement to meet. The QoS requirements for the services may be derived from the application layer in FIG. 2B, and they may also be indicated by the terminal device. A QoS requirement may correspond to a combination of values. For example, the combination of values for a QoS requirement may be a 3-tuple (e.g., three out of a bit rate, a latency, and/or a packet/bit/block error rate, etc.). A QoS requirement may be identified by an index within the sidelink performance information table, and when a terminal device transmits a message containing a set of QoS requirements, the message only needs to identify the corresponding indices instead of the specific combinations of values. The message indicates the set of QoS requirements that the transmitting terminal device intends to fulfill for its traffic per one embodiment of the disclosure.

Note that a QoS requirement may correspond to a priority of the service requiring the QoS. That is, a V2X service may give a higher or lower priority based on its QoS requirement, and instead of the sidelink performance information tracking particular QoS requirements, the sidelink performance information may indicate a priority of a V2X service.

Yet another type of sidelink performance information is radio conditions at reference 306, which may be measured or estimated. The radio conditions may include current and historical traffic loads, interference level, signal strength and physical layer quality measurements. The physical layer quality measurements may be indicated through block/bit error rate (BLER/BER), latency, jitter, etc.

Each parameter may be set to one or more values. The values may be measured or estimated based on other measurements. The values may be obtained locally by a terminal device or received from a network device/terminal device with which the terminal device communicates.

The sidelink performance information may be transmitted to a peer terminal device so that the two terminal devices may establish a sidelink communications. A variety of ways may indicate the sidelink performance information.

Indication of Sidelink Performance Information

The transmission of the sidelink performance information from one terminal device to a peer terminal device may be performed using a message from the terminal device to the peer terminal device.

The sidelink performance information may be transmitted together with the message (e.g., periodically broadcasted) over sidelink (e.g., CAM, or beacon packet), using different logical channels in the same SL-SCH MAC SDU. Special logical channel ID(s) may be (pre)configured in SL-SCH MAC header to indicate that the sidelink performance information is transmitted on that logical channel(s). In this approach, CAM/beacon and the sidelink performance information are automatically associated, so the receiving terminal device can automatically know if the CAM/beacon and the sidelink performance information are from the same transmitting terminal device.

The sidelink performance information may be transmitted using a separate control signaling, e.g., a separate MAC CE, over a sidelink. When a MAC CE is used, special logical channel ID(s) (LCID) may be (pre)configured in the MAC header to indicate that this is a MAC CE for sidelink performance information. The DST field in the MAC header could be set to a specific value (e.g., all zeros, "00 . . . 0"), or the V field could be set to a specific value (e.g., all zeros, "0 . . . 0"). In the latter case the DST field could be omitted, which indicates that a control signaling is transmitted.

When different source (Layer-2) IDs are used for CAM and control signaling, CAM could be associated with the control signaling by either including the source (Layer-2) ID for the control signaling in the channel where CAM is transmitted (included in either the MAC header or CAM), or including the source (Layer-2) ID for CAM in the channel where the control signaling is transmitted (included in either the MAC header or the control signaling).

In one embodiment, a transmitting terminal device transmits in the MAC PDU sub-header, a value in the SRC field corresponding to its own source layer-2 address, and a value in the DST field corresponding to the layer-2 destination address of the intended receiving terminal device as indicated by upper layers. A dedicated LCID is then also used in the MAC PDU sub-header to indicate that this specific MAC PDU contains sidelink performance information. For example, the LCID may correspond to a MAC CE to be multiplexed in a given MAC PDU. Only the intended terminal device that has a L2 destination address that matches the DST field may decode the sidelink performance information contained in the MAC CE. The sidelink performance information itself may be represented by a bitmap in the MAC CE, where each bit in the bitmap corresponds to a specific terminal device capability, or other specific QoS requirements for services and/or radio conditions. For example, a capability/QoS requirements/radio condition table (e.g., one similar to the one in FIG. 3) may be preconfigured in the terminal device, where each entry of such a table corresponds to a specific parameter and parameter/values. The bits in the MAC CE bitmap represent the entries (e.g., the indices), of such a table. In particular, the terminal device may set the bit of such bitmap to '1' if that specific sidelink performance information index is supported and '0' otherwise, or vice versa.

In one embodiment, the sidelink performance information may be signaled in RRC signaling. For example, the specific sidelink performance information for a terminal device can be signaled with a capability/QoS requirements/radio condition table where each entry represents sidelink performance information of the terminal device (e.g., a supported capability of the terminal device, supported QoS requirements for services by the terminal device, and/or supported radio conditions for sidelink communication by the terminal device). The signal may also contain a field indicating the source address and the unicast/multicast destination address. Alternatively, the RRC message is multiplexed in a dedicated MAC PDU payload which in its header contains the layer-2 destination and the source address. Such MAC PDU can be associated to a dedicated LCID (e.g., a MAC CE), and it can be triggered by an RRC signal (e.g., the RRC signal indicating to MAC when to transmit such LCID with the related payload).

While the sidelink performance information may be transmitted through one message, multiple messages may transmit the sidelink performance information from one terminal device to another. Additionally, the multiple messages may not use the same signaling. For example, a portion of the sidelink performance information may be transmitted through MAC CEs, another portion through RRC messages, and yet another portion through CAM messages. The use of different signaling to transmit the sidelink performance information for one particular sidelink may be advantageous because it may utilize available radio resources of the terminal devices more efficiently (e.g., when there is not enough MAC CEs to transmit the full sidelink performance information, the terminal device may use available resources to transmit RRC messages to transmit a portion of the sidelink performance information).

Figures 4A, 4B:
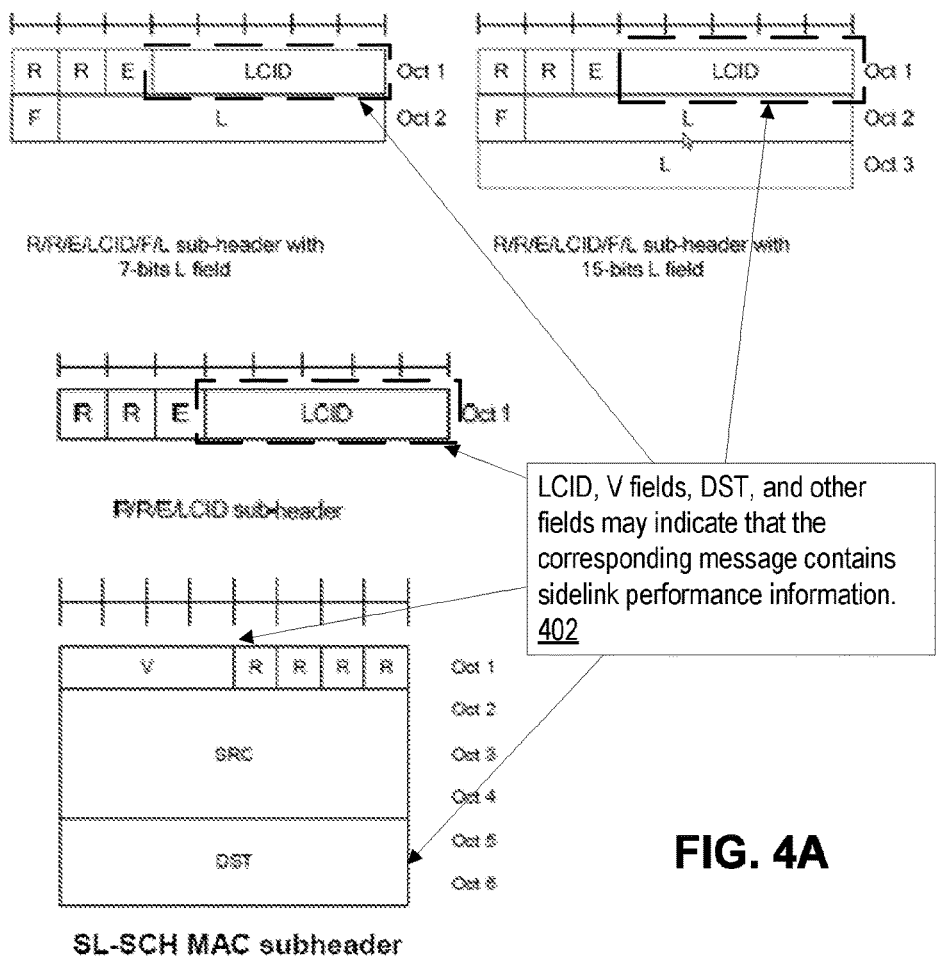
FIG. 4A shows that the Logical Channel Identity (LCID) field and/or V field may be set to particular values to indicate that the corresponding message contains sidelink performance information per one embodiment of the disclosure.
FIG. 4B shows the particular values that the corresponding message contains sidelink performance information per one embodiment of the disclosure.

FIG. 4 shows the ways that the sidelink performance information may be embedded within a message header per embodiments of the disclosure. FIG. 4A reference 402 shows that the LCID field V field, and/or DST field may be set to one or more particular values to indicate that the corresponding message contains sidelink performance information per one embodiment of the disclosure.

In one embodiment, one of the LCID fields, V field, and DST field is in a MAC header, which is a part of a MAC PDU. A MAC PDU consists of a MAC header, zero or more MAC service data units (MAC SDU), zero, one or more MAC control elements, and optionally padding. A MAC PDU header may consist of one or more MAC PDU sub-headers; each sub-header corresponds to either a MAC SDU, a MAC control element or padding. The LCID fields and V field are in a sub-header per embodiments of the disclosure.

More specifically, FIG. 4B shows the particular values indicating that the corresponding message contains sidelink performance information per one embodiment of the disclosure. The LCID values are defined in standards such as ETSI TS 136 321 V14.3.0 (2017 July) "LTE; Evolved Universal Terrestrial Radio Access (E-UTRA); Medium Access Control (MAC) protocol specification." The current standards have not defined values between 01100-10100 ("reserved"), and one or more of these values as shown at reference 404 may be used to indicate that the MAC PDU carries the sidelink performance information. The sidelink performance information itself may be carried in the MAC SDU or MAC control elements per embodiments of the disclosure.

Figure 4C:
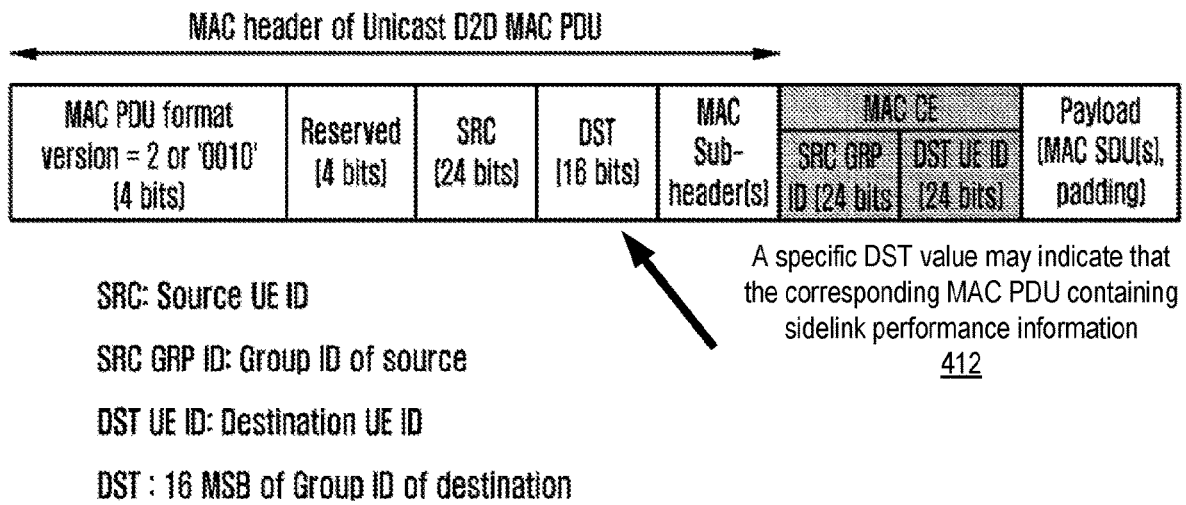
FIG. 4C shows a Medium Access Control (MAC) header including an indication for sidelink performance information per one embodiment of the disclosure.

FIG. 4C shows a MAC header including an indication for sidelink performance information per one embodiment of the disclosure. The exemplary MAC header is for unicast D2D MAC PDU, which contains a destination field, DST. A specific DST value may indicate that the corresponding MAC PDU contains sidelink performance information as shown at reference 412. Note that other MAC header formats, and/or for multicast/broadcast may apply the same or different DST values to indicate that the corresponding MAC PDU contains the sidelink performance information.

Figure 4D:
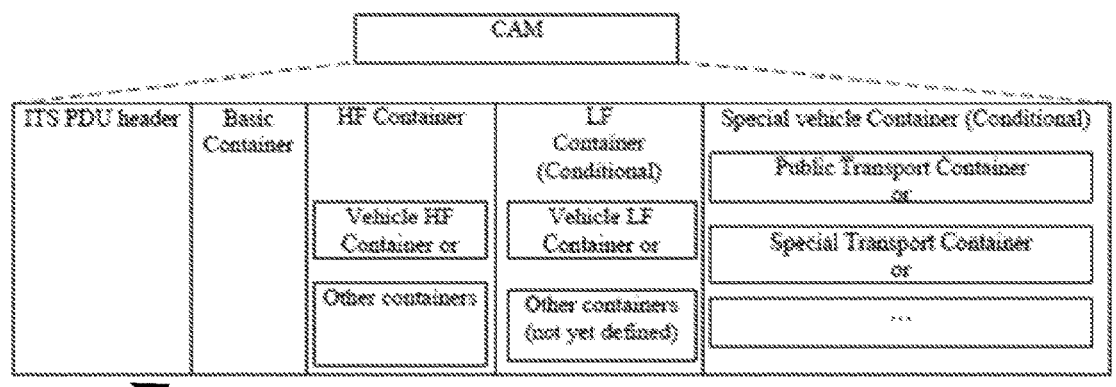
FIG. 4D shows a cooperative awareness message (CAM) including an indication for sidelink performance information per one embodiment of the disclosure.

FIG. 4D shows a cooperative awareness message (CAM) including an indication for sidelink performance information per one embodiment of the disclosure. The indication is included in the intelligent transport system (ITS) PDU header, and it may be a specific value (pre)configured for indicating the corresponding CAM containing the sidelink performance information as shown at reference 418.

The indication of the sidelink performance information is sent in a message by a transmitting terminal device to provide its sidelink performance information to a receiving terminal device. Of the at least three categories of the sidelink performance information discussed herein, the transmitting terminal device may provide information in a single category or a combination of two or more categories. For example, the transmitting terminal device may indicate a subset of total QoS requirements that it supports based on the current/historical radio conditions of a given sidelink communication; it may indicate a subset of sidelink capabilities that it supports based on the QoS requirements it intends to support; and it may also indicate radio conditions that are relevant to a particular set of QoS requirements that the transmitting terminal device intends to support. In other words, the indication of sidelink performance information identifies that the message embedding the indication provides sidelink performance information, and the provided sidelink performance information may be of various information types based on the transmitting terminal device's intent and/or the need for the sidelink communication.

Sidelink Discovery Using Sidelink Performance Information

Once a terminal device receives the sidelink performance information from the transmitting terminal device, the receiving terminal device may determine/estimate the (maximum) achievable sidelink performance based on its sidelink capability and the received sidelink performance information. The determination/estimation may be also based on the receiving terminal device's QoS requirements of services and/or the radio conditions for sidelink communication. In other words, the termination/estimation may be based on the received sidelink performance information and its own sidelink performance information (e.g., the supported capability of the terminal device, supported QoS requirements for services by the terminal device, and/or supported radio conditions for sidelink communication by the terminal device). Note that the sidelink performance information may be received by a terminal device during the sidelink discovery per one embodiment of the disclosure, and the terminal device may not have engaged in sidelink establishment procedure with a particular terminal device. Thus, the terminal device, with the provided sidelink performance information may adjust how its sidelink discovery procedure is to be performed.

In one embodiment, based on the received sidelink performance information and its own sidelink performance, a terminal device may suspend or increase the periodicity of transmission of discovery announcement or request for a V2X service if the terminal device has no or a low potential to meet the QoS requirement of the service with any terminal device within a (pre)configured range; or it may increase the transmission periodicity if the (shortest) distance to the neighbor terminal devices exceeds a certain threshold, even the terminal device is interested in that V2X service. The range and the distance threshold may be service dependent.

The same terminal device may also, based on the received sidelink performance information and its own sidelink performance, decrease the periodicity of transmission of a discovery message (e.g., a discovery announcement, a discovery request, or a discovery response) for a V2X service if the terminal device has a high potential to meet the QoS requirement of the service with more than a certain number of terminal devices within a (pre)configured range, and/or the (shortest) distance to the neighboring terminal devices is below a certain threshold (in which case decreasing the periodicity is really needed and/or could really bring benefit). The threshold values and the number of terminal devices may also be service dependent thus (pre)configured accordingly.

In one embodiment, a terminal device may, based on the received sidelink performance information and its own sidelink performance, suspend or postpone the transmission of discovery response for a certain V2X service if the terminal device is out of a (pre)configured range from a peer UE transmitting discovery request, and/or it cannot meet the QoS requirement of the service, even if the terminal device is interested in that V2X service. The range may also be service dependent.

The same terminal device may also, based on the received sidelink performance information and its own sidelink performance, indicate in a discovery response how likely a QoS requirement can be met.

In discovery transmission, a terminal device may assert priority of one discovery transmission over another. Based on the received sidelink performance information and its own sidelink performance, the terminal device may decrease the priority for a discovery transmission when the above conditions for suspending discovery transmission or increasing the periodicity of transmission of discovery announcement are met; and the terminal device may increase the priority when the above conditions for decreasing discovery transmission periodicity are met. Similarly, a terminal device may decrease the priority for a request for a certain V2X service when the above conditions for suspending or increasing the periodicity of transmission the request are met. The change of priority of the transmission may be an alternative or additional mechanism to the change of the periodicity in updating the transmission based on the received sidelink performance information and its own sidelink performance.

By adjusting the periodicity and/or priority of the transmission from a terminal device, the terminal device may perform the discovery transmission and the request for V2X services adaptively based on the received sidelink performance information and its own sidelink performance. The terminal device may avoid unnecessary transmission when the terminal device determines that a transmission unlikely will result in a successful sidelink discovery or fulfilling the required V2X services, and the terminal device may focus its transmission in the duration that likely results in a successful sidelink discovery or fulfilling the required V2X services. Thus, embodiments of the disclosure allow a transmitting terminal device to be more efficient in sidelink discovery and serving V2X service requests.

Sidelink Establishment Determination Using Sidelink Performance Information

A terminal device may also establish a direct sidelink with another terminal device based on the received sidelink performance information and its own sidelink performance. The terminal device may discover several terminal devices in its proximity. Additionally, the terminal device determines that it has a shorter distance to a first neighboring terminal device than that to a second neighboring terminal device, based on a radio condition (e.g., the interference levels to the first and second neighboring terminal devices or the signal strengths from the first and second neighboring terminal devices). The terminal device may prioritize the direct sidelink connection (a radio connection) with the first neighboring terminal device over one with the second neighboring terminal device.

Additionally, the terminal device may determine that it has a first distance to a first neighboring terminal device that is less than a first distance threshold (e.g., within a range) and it has a second distance to a second neighboring terminal device that is more than the first distance threshold or a second distance threshold based on the received sidelink performance information. The terminal device may prioritize the direct sidelink connection with the first neighboring terminal device over one with the second neighboring terminal device based on the determination. Such prioritization may ensure safety between the two terminal devices (e.g., avoiding two vehicles being too close to each other), and also may save resources in sidelink establishment.

Furthermore, the terminal device may determine that the direct sidelink connection with the first neighboring terminal device is more critical than that with the second neighboring terminal device. The determination may be based on the QoS requirements for services supported by the neighboring terminal devices (based on the received sidelink performance information) and the ones supported by itself (examining its own sidelink performance information). The terminal device may prioritize the direct sidelink connection with the first neighboring terminal device over one with the second neighboring terminal device based on the determination.

While the distance between the terminal device and its neighboring terminal devices and QoS requirements are obvious choices for determining to which neighboring terminal device to establish a direct sidelink connection, embodiments of the disclosure are not so limited. Other parameters such as available resources for sidelink capabilities (see parameters/values for the sidelink capabilities 302 and related discussion as examples), and radio conditions of the terminal device and its neighboring terminal devices (see parameters/values for the radio conditions 306 and related discussion as examples) may be also used to determine to which neighboring terminal device to establish a direct sidelink connection. That is, the terminal device may determine the priorities of establishing direct sidelink connections to its neighboring terminal devices based on the degree of sidelink capability matches, availability and criticality of resources used to establish the sitelinks (e.g., a band combination for simultaneous sidelink may be available for one sidelink but not another) per embodiments of the disclosure.

A terminal device may suspend or postpone a direct sidelink connection with a neighboring terminal device, if for the V2X services in which both terminal devices are interested (all or subsets of all the interested V2X services), where the direct sidelink connection (unicast, multicast, or broadcast) is needed, the distance between the two terminal devices are over a (pre)configured threshold, or the QoS requirements for the interested V2X services are unlikely met. The (pre)configured threshold may vary based on what is included in the interested V2X services between the two terminal devices in one embodiment. Note that the suspension and postponement may also be based on other sidelink capabilities of the terminal device and/or the neighboring terminal device, priorities of V2X services (e.g., based on QoS requirements for services), and radio conditions, all of which may be used similarly in determining the priority of establishing direct sidelink connections with multiple neighboring terminal devices.

Additionally, a terminal device may release a direct sidelink connection with a neighboring terminal device if one or more conditions regarding sidelink capability matching, QoS requirements for services, and radio conditions are met (e.g., a value of a parameter over a (pre)configured threshold).

Note that the one or more conditions regarding sidelink capability matching, QoS requirements for services, and radio conditions may be different for the same sidelink performance information parameter depending on the conditions being for prioritizing, suspending/postponing, or releasing a direct sidelink connection. Additionally, the one or more conditions may be configured or pre-configured by the wireless network and transmitted to the terminal devices using a dedicated or common control signaling, or the terminal devices may be configured directly by an application with little or no input from the wireless network. Furthermore, the one or more conditions and their associated values (e.g., thresholds) may be adjusted over time based on how well these conditions are used historically.

Note that for V2X services, the one or more conditions and their associated values (e.g., thresholds) may be (pre) configured based on different vehicle types (car, trunk, ambulance, police wagon, etc.) and different V2X services.

The use of sidelink performance information makes establishing sidelink connections timely and it avoids/delays establishing a sidelink connection or release the sidelink connection when the sidelink capabilities, QoS requirements for services, and/or radio conditions between two terminal devices are worse than expected based on the received and/or local sidelink performance information. Thus, embodiments of the disclosure save resources by reducing unnecessary sidelink connection establishment processes when the sidelink performance information indicates such processes waste resources.

Operations of Establishing Sidelink Using Sidelink Performance Information

Once a first terminal device determines to establish a sidelink connection with a second terminal device based on sidelink performance information, it sends out a request to establish the sidelink connection with the second terminal device. The second terminal device may or may not be the same terminal device that sends its sidelink performance information to the first terminal device. For example, in the scenarios discussed above where a terminal device has multiple neighboring terminal devices, a first neighboring terminal device may send its sidelink performance information to the first terminal device. The first terminal device may decide to establish the sidelink connection with the second neighboring terminal device based on the received sidelink performance information and its own sidelink performance information. The second terminal device, which receives the sidelink connection request, and is referred to as the "receiving" terminal device in this section, will decide how to respond to the sidelink connection request. The first terminal device, since it sends the request to establish the sidelink connection, is referred to as a "transmitting" terminal device (even though it may receive sidelink performance information from another terminal device).

The receiving terminal device compares the received sidelink performance information with its own sidelink performance information and decides whether to establish a sidelink connection, and if it decides to, how to establish the sidelink connection. If the local and received sidelink performance information indicate a matching (e.g., satisfying the one or more conditions regarding sidelink capability matching, QoS requirements for services, and radio conditions discussed herein above), the receiving terminal device may reply with an acknowledgement to the sending terminal device, indicating that a sidelink connection can be established between the two terminal devices.

The acknowledgement from the receiving terminal device may be sent in a MAC message (e.g., a MAC CE for link establishment) or in an RRC message. In one embodiment, the acknowledgement is indicated by a flag (e.g., 1 bit, where '1' represents that a sidelink connect can be established while '0' represents the opposite) in the MAC or RRC message.

In one embodiment, the receiving terminal device may acknowledge that a number of specific services (e.g., V2X services) may be provided in a sidelink connection between the two terminal devices. For example, the receiving terminal device may determine that only the number of specific services may be supported based on the local and received sidelink performance information. The acknowledgement may be a bitmap indicating the specific services in one embodiment.

In another embodiment, instead of acknowledging the specific services that the receiving terminal device believes a sidelink connection between the two terminal devices may provide, the receiving terminal device may send its sidelink performance information, such as its own sidelink capabilities, QoS requirements for services, and/or radio conditions to the transmitting terminal device, and let the transmitting terminal device decide how to establish the sidelink connection. The sidelink performance information may be all the information that the receiving terminal device has for sidelink communication or only a subset of the sidelink performance information. For example, the subset may be the sidelink capabilities and/or QoS requirements for services that the receiving terminal device may support, or the subset may be the sidelink capabilities and/or QoS requirements that the two terminal devices share (e.g., overlapping sidelink capabilities and/or QoS requirements). In one embodiment, the sidelink performance information is sent through a MAC CE or an RRC message as discussed herein above.

In one embodiment, the receiving terminal device may evaluate the received sidelink performance information and if it contains at least partially matching sidelink capabilities and/or QoS requirements with its own ones, the evaluation may be based on received and local radio conditions. If the matching is found, the receiving terminal device may indicate to the upper layers (e.g., the RLC layer, the PDCP layer, the IP/ARP layer, and/or the application layer) that a unicast connection can be established with the transmitting terminal device. Otherwise, the receiving terminal device may indicate to the upper layers that the unicast connection with the transmitting terminal device may not be established. The indication may include a link layer address of the transmitting terminal device and/or the higher layer destination address of the transmitting terminal device, as well as sidelink capabilities and/or QoS requirements that may be used for the unicast connection. Higher layers of the receiving terminal device then indicate to the higher layers of the transmitting terminal device whether a unicast connection may be established; and if yes, the sidelink capabilities and the QoS requirements are used for such unicast connection.

In setting up the unicast connection, the receiving terminal device configures the lower layers (the physical layer, and/or the MAC layer) to enable the unicast connection with the transmitting terminal device by setting the radio parameters (e.g., ones discussed relating to sidelink capabilities 302 in FIG. 3) and/or the QoS requirements (e.g., ones discussed relating to the QoS requirements for services 304) such that they are aligned with the capability/QoS requirements of the transmitting terminal device.

The transmitting terminal device upon receiving the indication from the transmitting terminal device, either via a MAC CE or an RRC message or via the higher layers, configures the lower layers to enable a unicast connection with the transmitting terminal device by setting the radio parameters and/or QoS requirements such that they are aligned with the capability/QoS requirements of the receiving terminal device.

Figure 5:
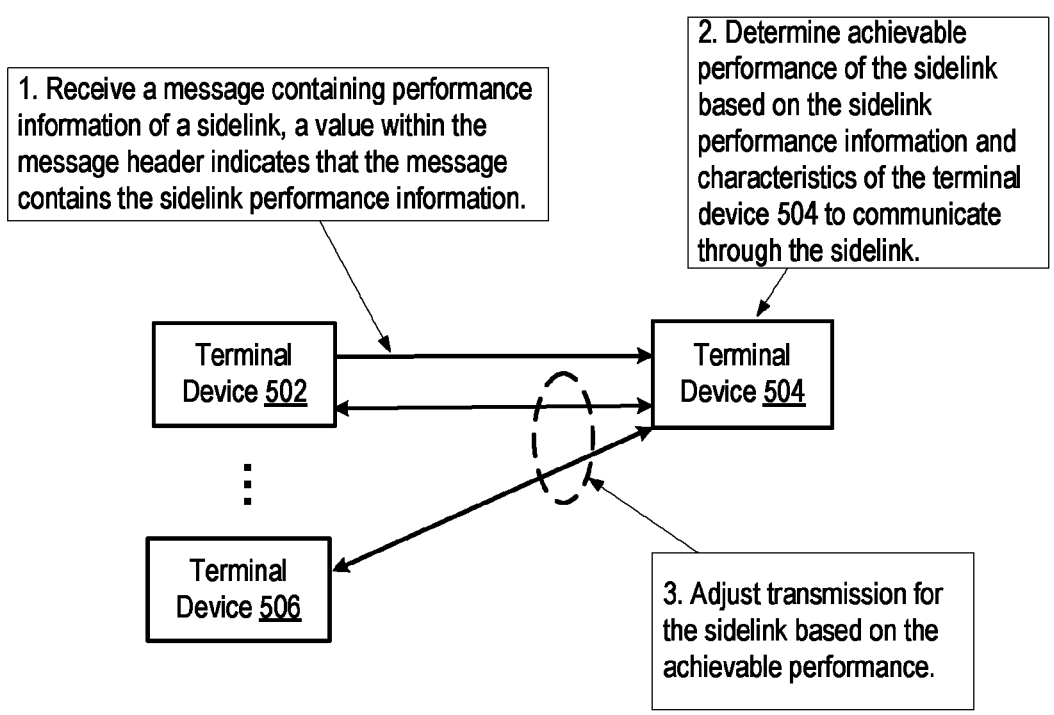
FIG. 5 shows the adjustment of transmission for sidelink communication per one embodiment of the disclosure.

Adjusting for Sidelink Communication Based on Sidelink Performance Information FIG. 5 shows the adjustment of transmission for sidelink communication per one embodiment of the disclosure. The task boxes 1-3 illustrate an order of operations may be performed per one embodiment of the disclosure.

At task box 1, a terminal device 504 receives a message containing performance information of a sidelink from another terminal device 502. The message contains a value indicating that the message indicates that the message contains the sidelink performance information.

The sidelink performance information includes one or more of a set of terminal device sidelink capabilities (e.g., the ones discussed relating to the sidelink capabilities 302), a set of quality of service requirements for V2X services (e.g., the ones discussed relating to the QoS requirements for services 304), and/or a set of radio conditions (e.g., the ones discussed relating to the radio conditions 306). The sidelink performance information is the information that supports a sidelink with another terminal device (e.g., the terminal device 502). For example, the sidelink performance information may include the terminal device sidelink capabilities of the terminal device 502, the QoS requirements for services supported by the terminal device 502, and/or the radio conditions that support the sidelink with the terminal device 502.

The value is multiplexed into a radio bearer in one embodiment, where the radio bearer may be a data or signaling bearer. In one embodiment, the value within the message's header is indicated in a logical channel identifier (ID) in a media access control (MAC) sub-header of a MAC control element (CE). In one embodiment, the value within the message's header is indicated in a destination field in a media access control (MAC) sub-header of a MAC control element (CE). In one embodiment, the value within the message's header is indicated in a "V" field in a media access control (MAC) sub-header of a MAC control element (CE).

In one embodiment, the value within the message's header is indicated in a source identifier (ID), a destination ID, or other header fields within a header of a cooperative awareness message (CAM). In an alternative embodiment, the value within the message's header is indicated in a radio resource control message. In yet another alternative embodiment, the message itself is a sidelink beacon packet.

At task box 2, the terminal device 504 determines achievable performance of the sidelink based on the sidelink performance information and characteristics of the terminal device 504 to communicate through the sidelink. The characteristics of the terminal device include one or more of a set of terminal device sidelink capabilities (e.g., the ones discussed relating to the sidelink capabilities 302), a set of quality of service requirements for V2X services (e.g., the ones discussed relating to the QoS requirements for services 304), and/or a set of radio condition (e.g., the ones discussed relating to the radio conditions 306). The characteristics include, for example, the terminal device sidelink capabilities of the terminal device 504, the QoS requirements for services supported by the terminal device 504, and/or the radio conditions that support the sidelink with the terminal device 504. The determination is based on the comparison of corresponding parameter values of the received sidelink performance information and the characteristics of the terminal device 504 to communicate through the sidelink and determine a overlapping sidelink capabilities and/or allowable QoS requirements for services per one embodiment of the disclosure.

At task box 3, the terminal device 504 adjusts its transmission for the sidelink based on the achievable performance. In one embodiment, the terminal device 504 suspends or increases periodicity of transmission of a discovery message (a discovery announcement message or a discovery request message) for a vehicle-to-everything (V2X) service when the terminal device 504 is determined to have a low probability to meet a quality of service requirement of the V2X service with a set of terminal devices within a range or distance. The set of the terminal devices may or may not include the terminal device 502. Otherwise, when the terminal device 504 is determined to have a high probability to meet a quality of service requirement of the V2X service with the set of terminal devices within the range or distance, the terminal device 504 decreases periodicity of transmission of the discovery message for the V2X service.

In one embodiment, the terminal device 504 may suspend or increase periodicity of transmission of a discovery response for a V2X service when the terminal device 504 is determined to have a low probability to meet a quality of service requirement of the V2X service or out of a range for peer terminal device transmitting discovery request. In one embodiment, the terminal device 504 may transmit a discovery response for a vehicle-to-everything (V2X) service, where the response includes an indication of a likelihood that a quality of service requirement of the V2X service can be met. The likelihood may be expressed as a probability in one embodiment of the disclosure.

In one embodiment, the terminal device 504 may adjust a priority of a discovery transmission based on a determination of a likelihood that a quality of service requirement of a vehicle-to-everything (V2X) service can be met. The adjustment may prioritize one V2X service over another, or one terminal device (e.g., the terminal device 506) over another (e.g., the terminal device 502) for sidelink connection establishment.

In one embodiment, the terminal device 504 may prioritize a sidelink establishment between the terminal device and a first neighboring terminal device over one between the terminal device and a second neighboring terminal based on at least one of a first distance between the terminal device and the first neighboring terminal device and a second distance between the terminal device and the second neighboring terminal device.

In one embodiment, the terminal device 504 may prioritize a sidelink establishment between the terminal device and a first neighboring terminal device over one between the terminal device and a second neighboring terminal based on criticality of the sidelink establishments. For example, the criticality of the sidelink establishments may be derived from the QoS requirements of the services of the two sidelink connections.

In one embodiment, the terminal device 504 may suspend or postpone a sidelink establishment between the terminal device and a neighboring terminal device if, for a set of vehicle-to-everything (V2X) services that are interested by the terminal device and the neighboring terminal device, a distance between the terminal device and the neighboring terminal device is over a threshold. The set of V2X services may be all the V2X services or a subset that are interested by both terminal devices.

In one embodiment, the terminal device 504 may suspend or postpone a sidelink establishment between the terminal device and a neighboring terminal device if, for a set of vehicle-to-everything (V2X) services that are interested by the terminal device and the neighboring terminal device, a likelihood that a quality of service requirement of the set of V2X services can be met is lower than a threshold.

In one embodiment, the terminal device 504 may release a sidelink between the terminal device and a neighboring terminal device if, for a set of vehicle-to-everything (V2X) services that are interested by the terminal device and the neighboring terminal device, a distance between the terminal device and the neighboring terminal device is over a threshold.

In one embodiment, the terminal device 504 may release a sidelink between the terminal device and a neighboring terminal device if, for a set of vehicle-to-everything (V2X) services that are interested by the terminal device and the neighboring terminal device, a duration that a quality of service requirement of the set of V2X services fails to meet is over a threshold.

Receiving Terminal Device Operations

Figure 6:
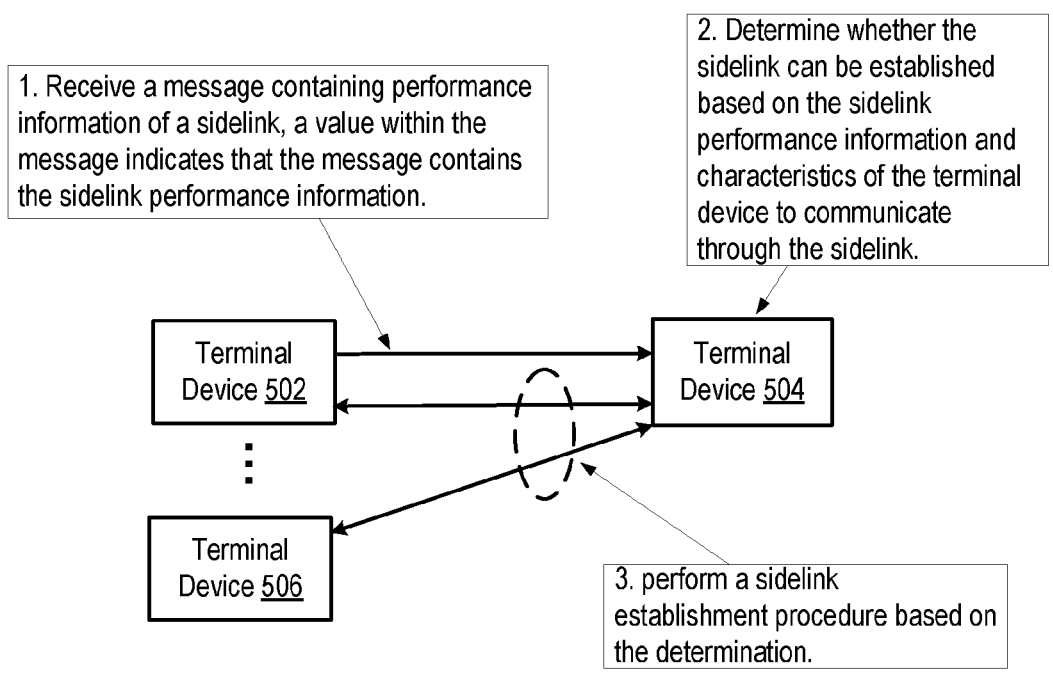
FIG. 6 shows the operations of a receiving terminal device for sidelink communication per one embodiment of the disclosure.

FIG. 6 shows the operations of a receiving terminal device for sidelink communication per one embodiment of the disclosure. The task boxes 1-3 illustrate an order of operations may be performed per one embodiment of the disclosure The operations in task box 1 is similar to the ones performed in the task box 1 of FIG. 5, thus the discussion is not repeated. At task box 2, the terminal device 504 determines whether the sidelink can be established based on the sidelink performance information and the characteristics of the terminal device 504 to communicate through the sidelink. The determination is similar to the ones performed in the task box 2 of FIG. 5, and the discussion is not repeated here.

At task box 3, the terminal device 504 performs a sidelink establishment procedure based on the determination in task box 2. In one embodiment, the terminal device 504 transmits an indication to the terminal device 502 that the sidelink can be established. In one embodiment, the indication is transmitted based on a comparison between (1) a set of terminal device sidelink capabilities received from the message and (2) a set of terminal device sidelink capabilities of the terminal device 504. In one embodiment, the comparison indicates at least a partial match of (1) the set of terminal device sidelink capabilities received from the message and (2) the set of terminal device sidelink capabilities of the first terminal device. In one embodiment, the indication is sent in a media access control (MAC) control element (CE) message or a radio resource control (RRC) message.

In one embodiment, the terminal device 504 sends a set of terminal device sidelink capabilities of the terminal device 504 to the terminal device 502. In one embodiment, the terminal device 504 compares a set of terminal device sidelink capabilities received from the message and a set of terminal device sidelink capabilities of the terminal device 504, and determine whether to set up a unicast connection between the terminal devices based on the comparison.

In one embodiment, the determination is to set up the unicast connection, and the terminal device 504 transmits an indication to a layer above a media access control (MAC) layer to set up the unicast connection. In one embodiment, the indication includes an address of the terminal device 502, e.g., the address in a radio link control (RLC) layer. In one embodiment, the layer above the MAC layer communicates with a corresponding layer of the terminal device 502 for setting up the unicast connection and performs the unicast connecting operations accordingly. In one embodiment, the indication further includes a subset of terminal device sidelink capabilities to be used to set up the unicast connection.

In one embodiment, the terminal device 504 examines a set of quality of service requirements for vehicle-to-everything (V2X) services received from the message and a set of radio conditions of the first terminal device, and determines whether to set up a unicast connection between the first and second terminal devices based on the examination. In one embodiment, the set of radio conditions includes at least one of: an interference level, a congestion level, a block error rate (BLER), a bit rate of the sidelink, a latency of the sidelink. In one embodiment, the examination further includes examination of the capability of the first terminal device to communicate through the sidelink.

Operations of Sidelink Operations

Figure 7A:
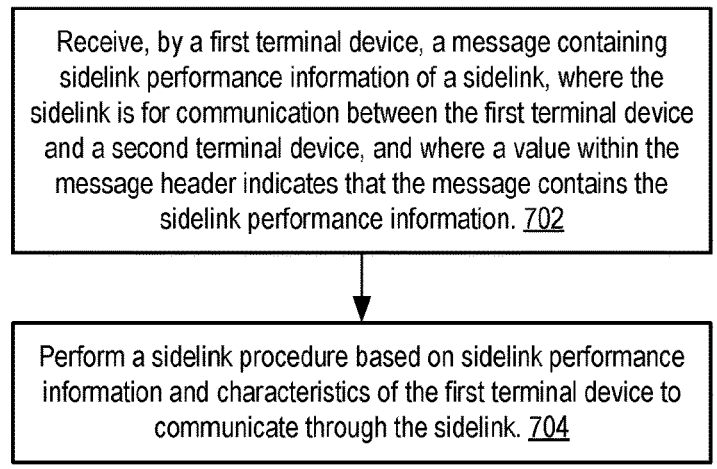
FIG. 7A is a block diagram illustrating operations of sidelink operations using sidelink communication information per one embodiment of the disclosure.

FIG. 7 is a block diagram illustrating operations of sidelink operations using sidelink communication information per one embodiment of the disclosure.

At reference 702, a first terminal device receives a message containing sidelink performance information of a sidelink, where the sidelink is for communication between the first terminal device and a second terminal device, and where a value within the message header indicates that the message contains the sidelink performance information. The various ways that the value may be indicated are discussed herein above.

Figure 7B:
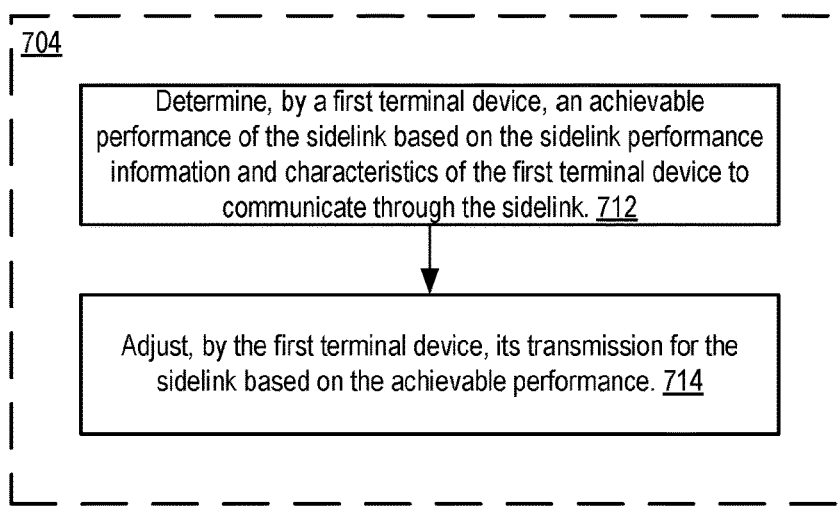
FIG. 7B shows a first embodiment of a sidelink procedure.

At reference 704, the first terminal device performs a sidelink procedure based on the sidelink performance information and characteristics of the first terminal device to communicate through the sidelink. The sidelink procedure may include the operations performed relating to FIG. 7B and/or FIG. 7C. FIG. 7B shows a first embodiment of a sidelink procedure, which includes operations within reference 704 in one embodiment. At reference 712, the first terminal determines an achievable performance of the sidelink as discussed herein above in one embodiment. Once the achievable performance of the sidelink is determined, the first terminal adjusts transmission for the sidelink based on the achievable performance as discussed herein above. The determination of the sidelink communication may, additionally or alternatively, include the determination of whether the sidelink can be established as discussed herein above in one embodiment.

Figure 7C:
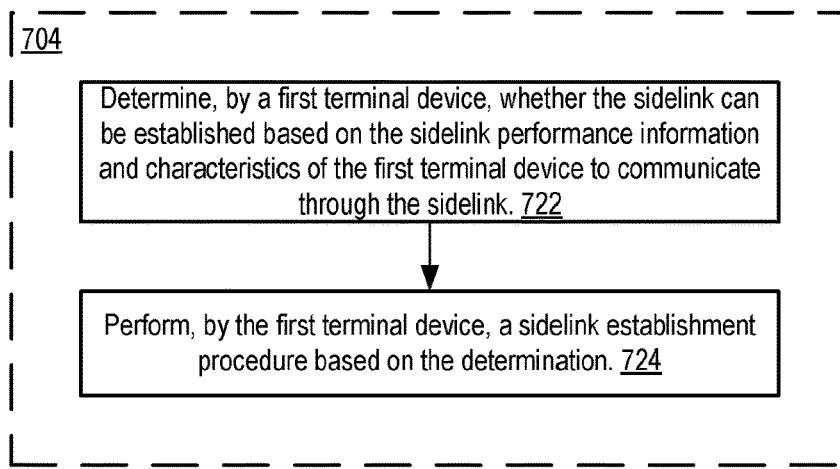
FIG. 7C shows a second embodiment of the sidelink procedure.

FIG. 7C shows a second embodiment of a sidelink procedure, which includes operations within reference 704 in one embodiment. At reference 722, the first terminal device determines whether the sidelink can be established as discussed herein above. Then at reference 724, the first terminal device performs a sidelink establishment procedure as discussed herein above.

Physical Resources Used in a Wireless Network

Figure 8A:
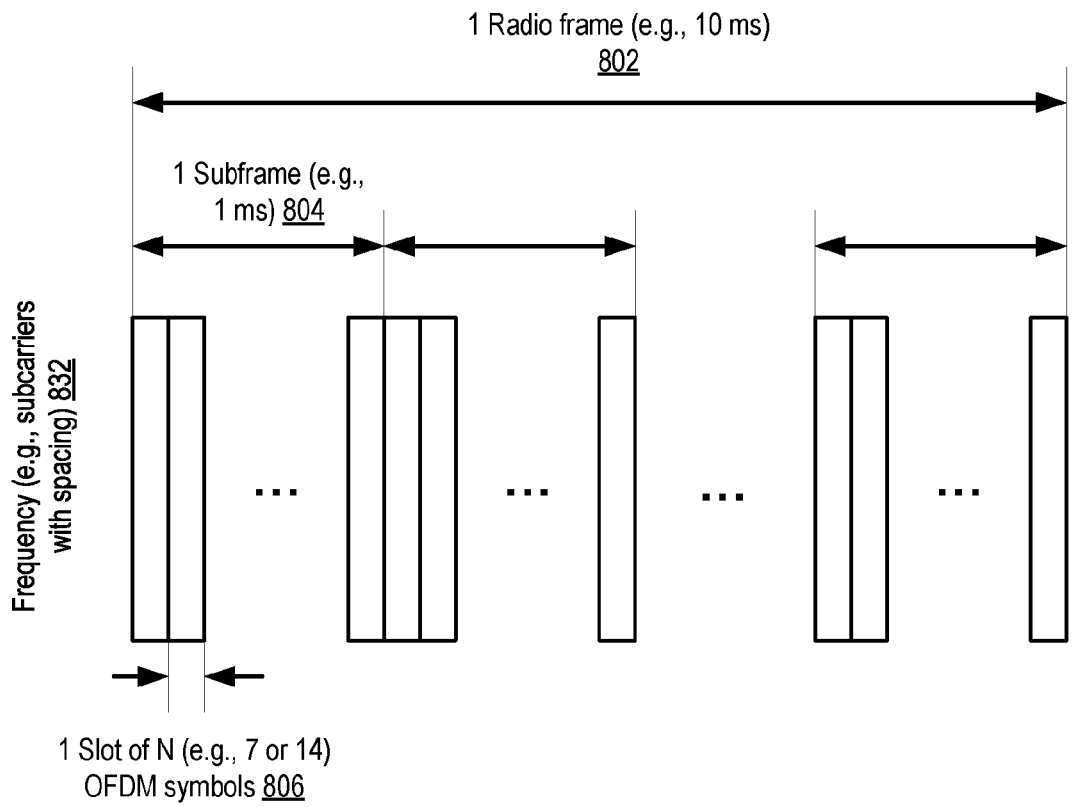
FIG. 8A shows an exemplary signal transmission hierarchy in a wireless network.

The sidelink capabilities discussed herein above uses signaling and resources in a wireless network. FIG. 8A shows an exemplary signal transmission hierarchy in a wireless network. The exemplary signal transmission hierarchy includes the transmission unit of frames such as a radio frame 802. A radio frame 802 takes ten milliseconds to transmit in one embodiment. The frame may contain a number of subframes such as subframe 804. In this example, the radio frame 802 contains ten subframes, each takes one millisecond. Each subframe may contain a number of slots. For example, a subframe may contain two slots. Each slot such as the slot at reference 806 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 832), each symbol may be transmitted over a number of subcarriers. A symbol may be transmitted using a number of resource blocks (RBs), each of which may contain 12 subcarriers in one embodiment. In one embodiment, each subcarrier includes a bandwidth (e.g., 7.5 kHZ or 15 kHZ) for transmission. One subcarrier×one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 8B:
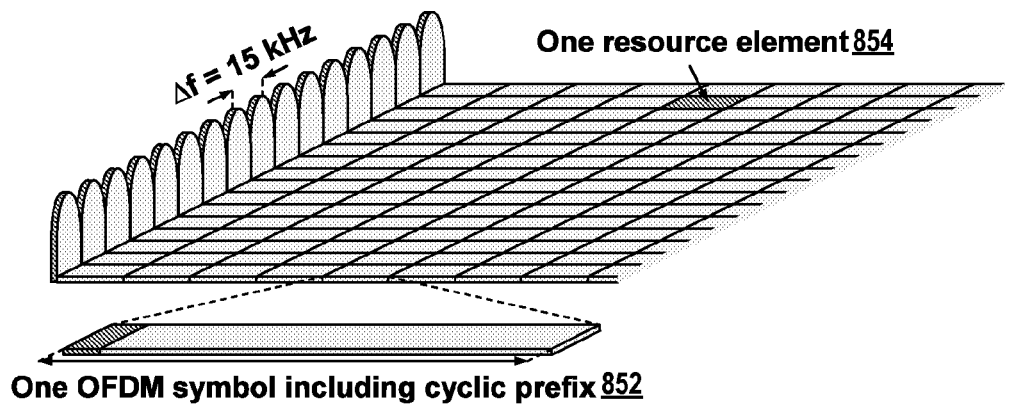
FIG. 8B shows resource elements used for data and signaling transmission.

FIG. 8B shows resource elements used for data and signaling transmission. The physical resources for transmission may be viewed as time and frequency grids as illustrated, where each resource element (e.g., resource element 854) occupies a time period in the time domain and a frequency range in the frequency domain. Each OFDM symbol includes a cyclic prefix as illustrated at reference 852. Each OFDM symbol utilizes a number of resource elements. In this example, the sub-carrier spacing is 15 k Hz, and the resource element (RE) 854 occupies an orthogonal frequency-division multiplexing (OFDM) subcarriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For downlink control, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same slot or a later slot (for mini-slots PDCCH can also be transmitted within a regular slot). Different formats (sizes) of the PDCCHs are possible to handle different DCI payload sizes and different aggregation levels (i.e., different code rate for a given payload size). A UE is configured (implicitly and/or explicitly) to blindly monitor (or search) for a number of PDCCH candidates of different aggregation levels and DCI payload sizes. Upon detecting a valid DCI message (i.e., the decoding of a candidate is successful and the DCI contains an ID the UE is told to monitor) the UE follows the DCI (e.g., receives the corresponding downlink data or transmits in the uplink). The blind decoding process comes at a cost in complexity in the UE but is required to provide flexible scheduling and handling of different DCI payload sizes.

Different NR use-cases (e.g., MBB (mobile broadband), URLLC (ultra-reliable low latency communication)) require different control regions (e.g., time, frequency, numerologies, etc.) & PDCCH configurations (e.g., operating points etc.) PDCCHs in NR are transmitted in configurable/dynamic control regions called control resource sets (CORESET) enabling variable use-cases. A CORESET is a subset of the downlink physical resource configured to carry control signaling. It is analogous to the control region in LTE but generalized in the sense that the set of physical resource blocks (PRBs) and the set of OFDM symbols in which it is located is configurable.

In one embodiment, CORESET configuration in frequency allocation is done in units of 6 RBs using NR downlink (DL) resource allocation Type 0: bitmap of RB groups (RBGs). CORESET configuration in time spans of 1-3 consecutive OFDM symbols. For slot-based scheduling, the CORESET span at the beginning of a slot is at most 2 if demodulation reference signal (DMRS) is located in OFDM Symbol (OS) #2 and is at most 3 if DMRS is located in OS #3. A UE monitors one or more CORESETs. Multiple CORESETs can be overlapped in frequency and time for a UE.

Some Embodiments of the Disclosure

Figure 9:
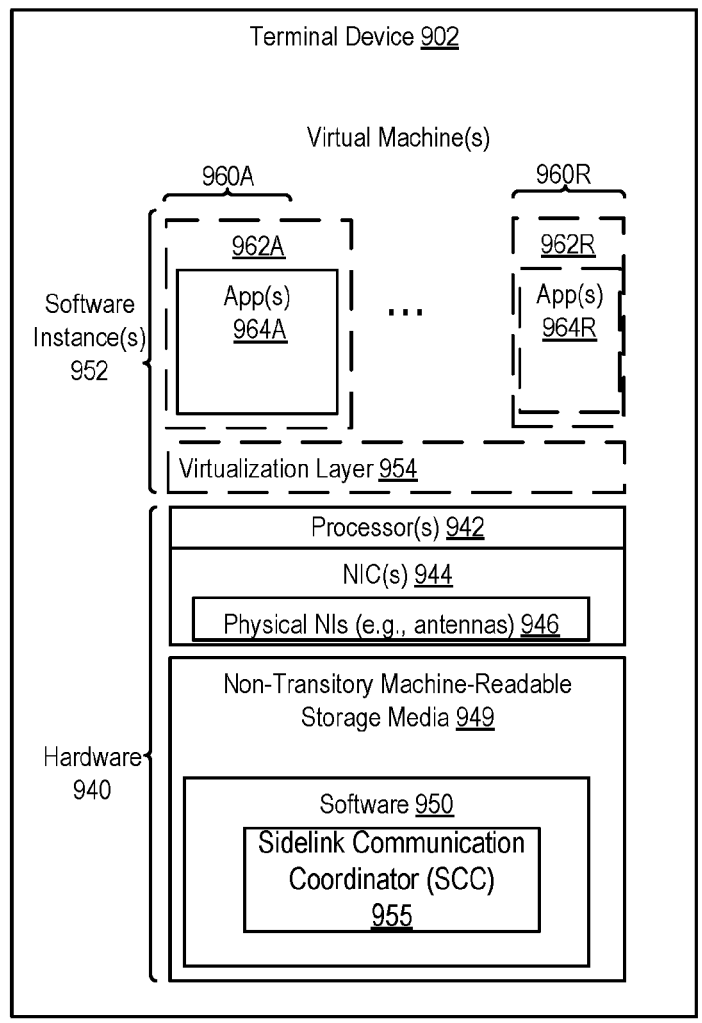
FIG. 9 shows a network device per one embodiment of the disclosure.

FIG. 9 shows a terminal device per one embodiment of the disclosure. The terminal device 902 may be the terminal devices 502 or 504. The terminal device 902 may be implemented using custom application-specific integrated-circuits (ASICs) as processors and a special-purpose operating system (OS), or common off-the-shelf (COTS) processors and a standard OS.

The terminal device 902 includes hardware 940 comprising a set of one or more processors 942 (or "processor circuitry," which are typically COTS processors or processor cores or ASICs) and physical NIs 946, as well as non-transitory machine-readable storage media 949 having stored therein software 950. During operation, the one or more processors 942 may execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R run on top of a guest operating system within an instance 962A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The software 950 contains a sidelink communication coordinator (SCC) 955. The sidelink communication coordinator (SCC) 955 may perform operations in the operations described with reference to earlier figures. The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual terminal device 960A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The NI is shown as network interface card (NIC) 944. The physical network interface 946 may include one or more antenna of the terminal device 902. An antenna port may or may not correspond to a physical antenna. The antenna comprises one or more radio interfaces.

Other Embodiments of the Disclosure

Figure 10:
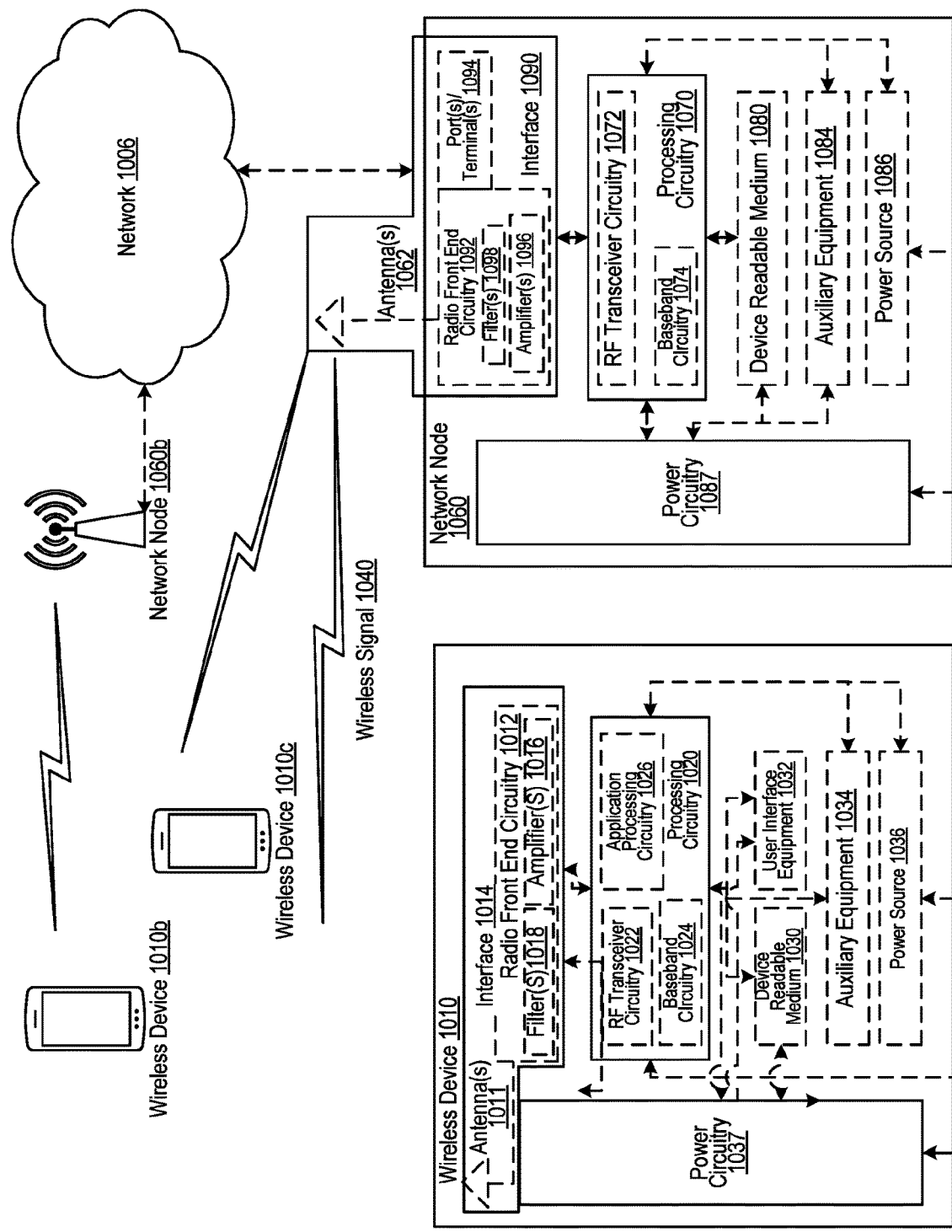
FIG. 10 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1061 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node, similar to network device discussed herein above, refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and an RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SoC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 674 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units.

In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signaling and/or data between network node 1060, network 606, and/or WDs 1010. As illustrated, interface 1090 comprises port(s)/terminal(s) 1094 to send and receive data, for example to and from network 606 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 694, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 686. Power source 686 and/or power circuitry 1087 may be configured to provide power to the various components of network node 1060 in a form suitable for the respective components (e.g., at a voltage and current level needed for each respective component). Power source 686 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 686 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 620 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 620. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020. In one embodiment, application processing circuitry 1026 includes SCC 955, which may perform operations as discussed herein above.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 636 to make the power suitable for the respective components of WD 1010 to which power is supplied.

Figure 11:
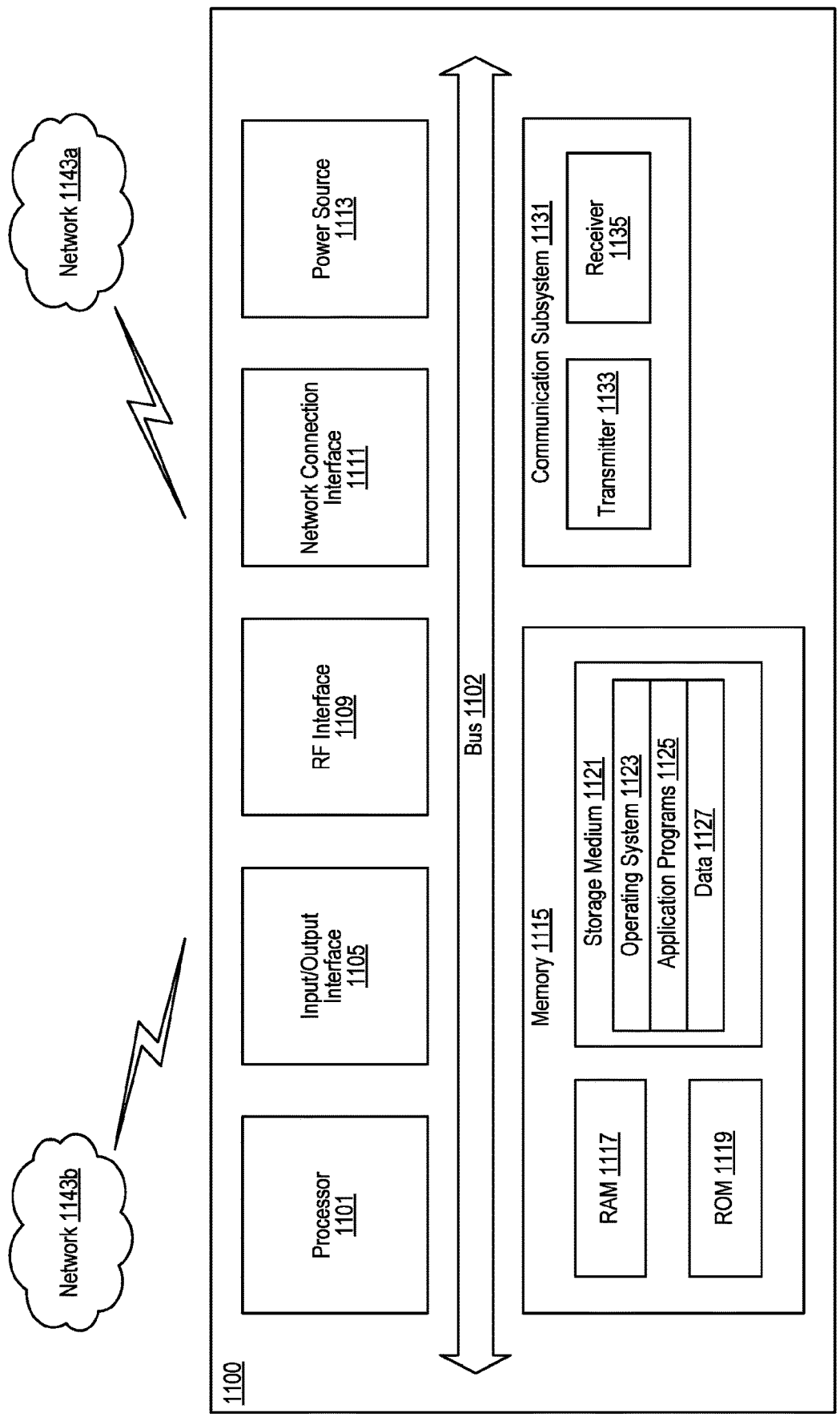
FIG. 11 shows a User Equipment (UE) in accordance with some embodiments.

FIG. 11 shows one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3$^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc. In one embodiment, application program 1125 includes SCC 955 discussed herein above.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.7, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
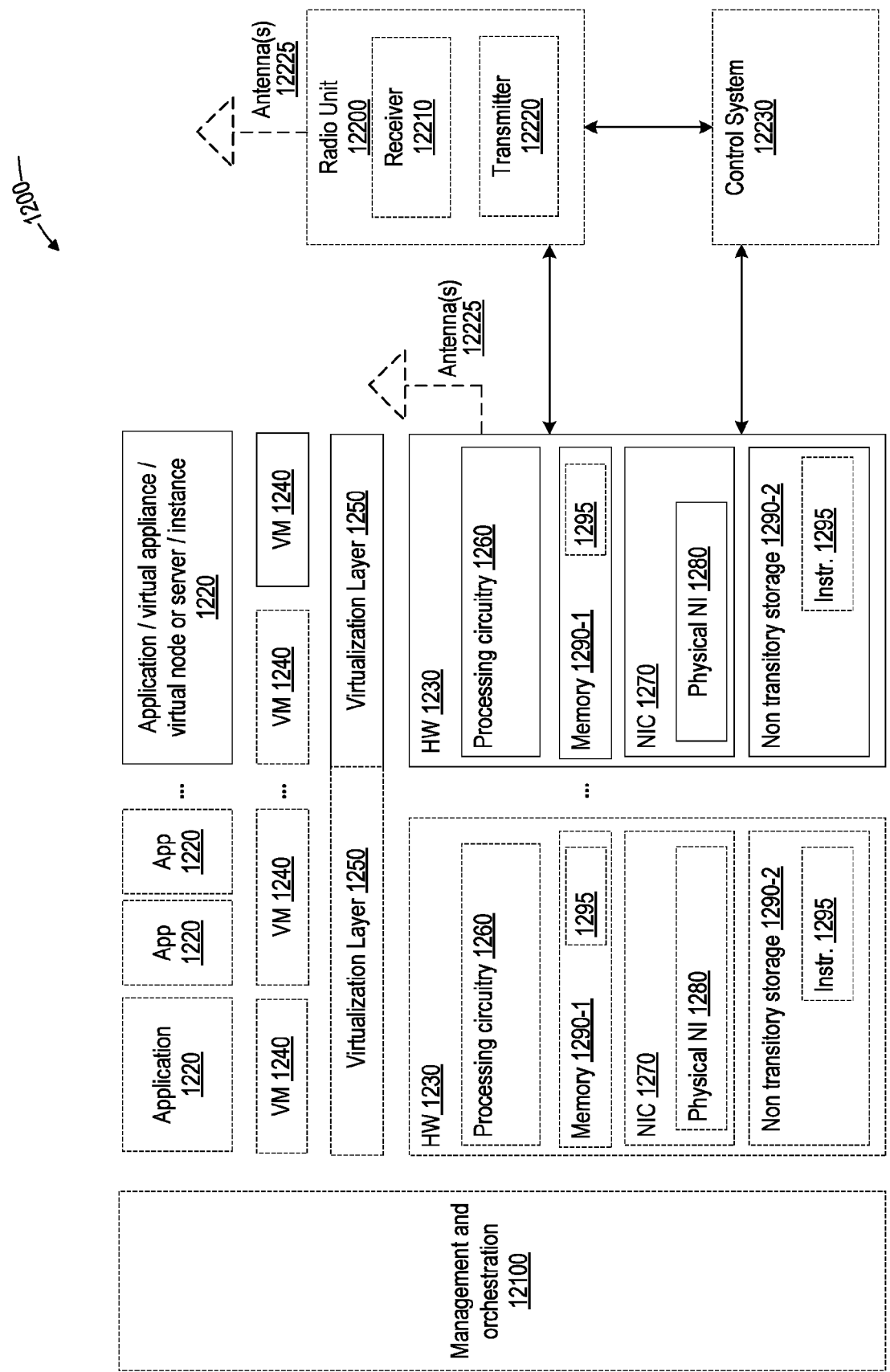
FIG. 12 shows a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g., in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 1230 and radio units 12200.

Figure 13:
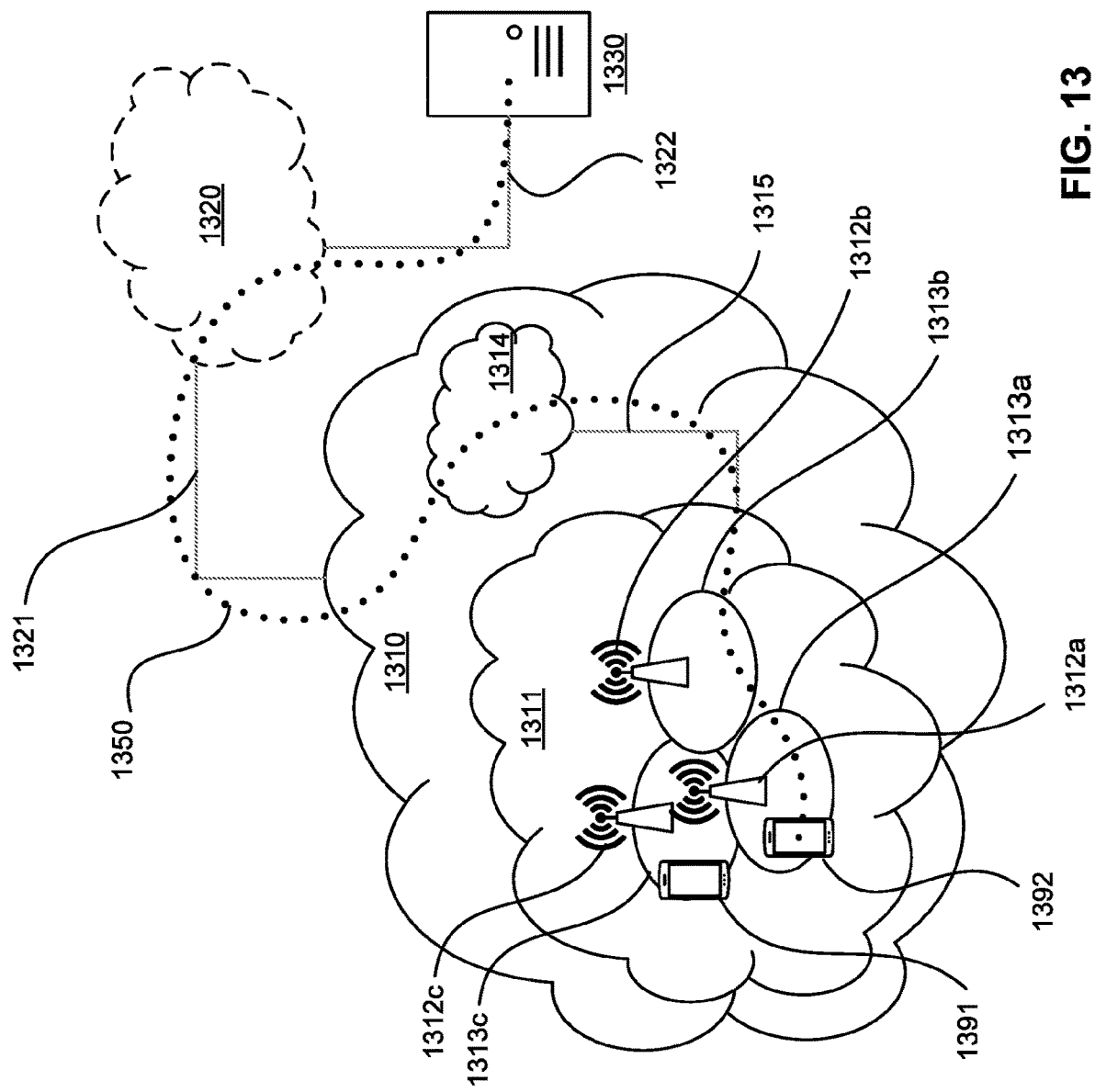
FIG. 13 shows a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NB s, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. The hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

Figure 14:
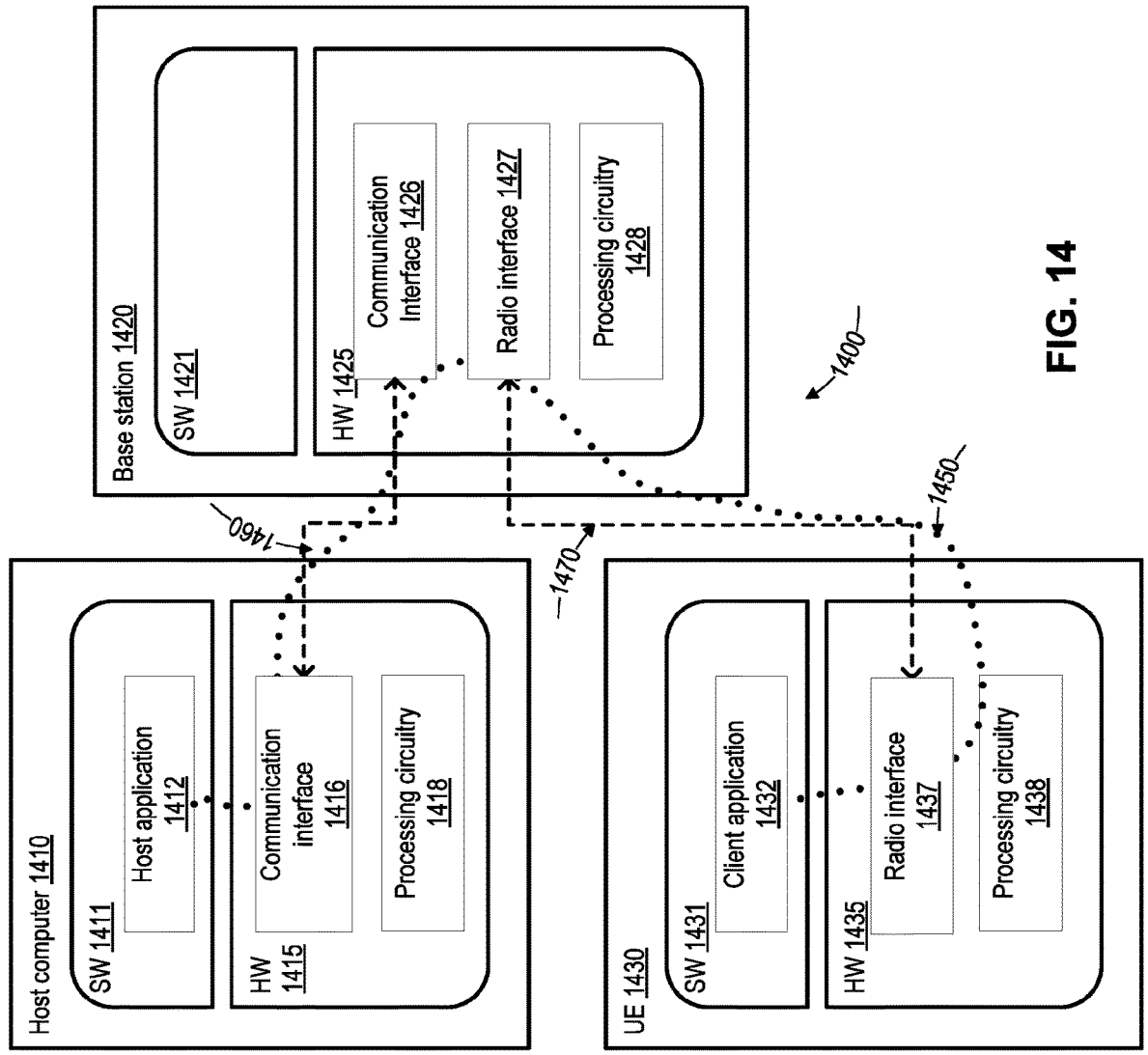
FIG. 14 shows a host computer communicating via a base station with a user equipment over a partially wireless connection in accordance with some embodiments.

It is noted that host computer 1410, base station 1420 and UE 1430 illustrated in FIG. 14 may be similar or identical to host computer 1330, one of base stations 1312*a*, 1312*b*, 1312*c* and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
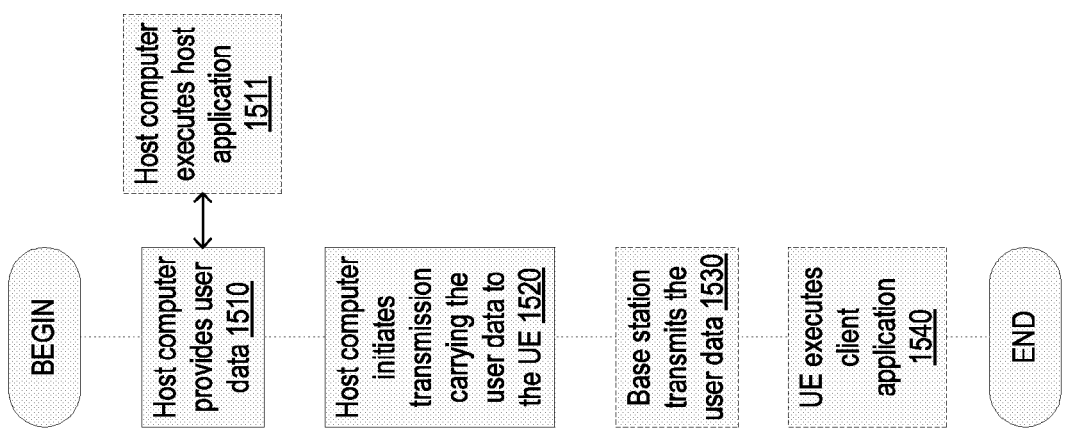
FIG. 15 shows a method implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
FIG. 16 shows a method implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
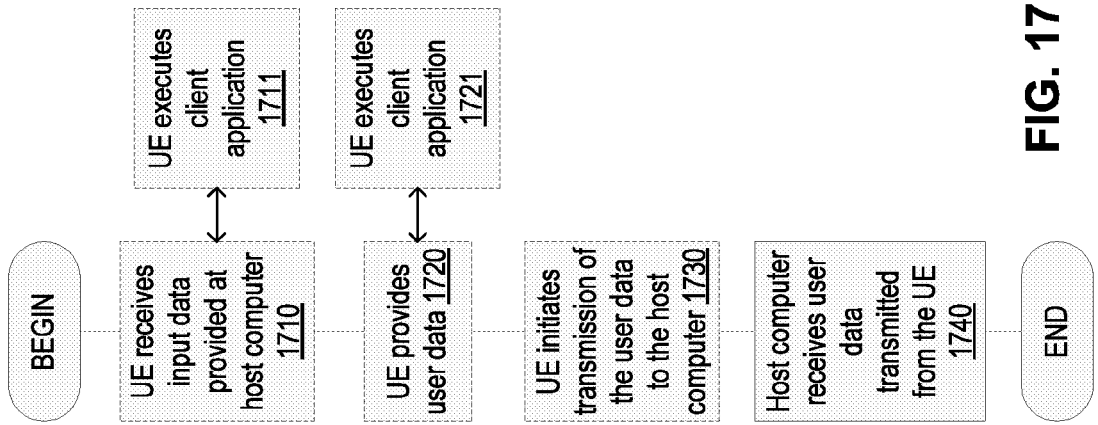
FIG. 17 shows a method implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
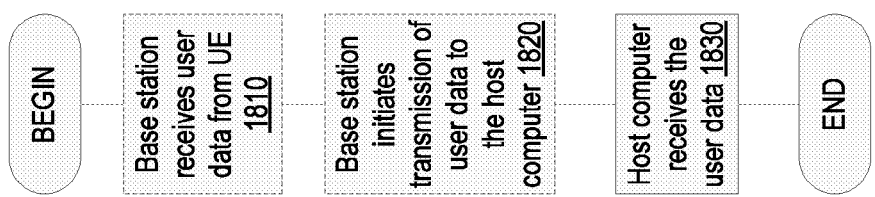
FIG. 18 shows a method implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method performed by a first terminal device for sidelink communication in a wireless network, the method comprising:
   estimating achievable sidelink performance based on sidelink performance information, the sidelink performance information comprising information about local radio conditions, sidelink capabilities of the first terminal device, sidelink capabilities of one or more neighboring terminal devices, and sidelink Quality-of-Service (QoS) requirements; and
   adjusting scheduling or priority associated with transmissions for sidelink discovery or sidelink establishment, in dependence on the estimated achievable sidelink performance, wherein adjusting the scheduling or the priority comprises one or more of the following:
  suspending transmission of sidelink discovery messages by the first terminal device, responsive to the estimated achievable sidelink performance indicating a low probability of meeting the sidelink QoS requirements;
  changing a periodicity of transmission by the first terminal device of the sidelink discovery messages, in dependence on a probability of meeting the sidelink QoS requirements, as determined from the estimated achievable sidelink performance;
  suspending or postponing transmission of a sidelink discovery response by the first terminal device;
  including in a sidelink discovery response transmitted by the first terminal device an indication of a likelihood of meeting the sidelink QoS requirements, and wherein the indication is based on the estimated achievable sidelink performance and the sidelink discovery response is transmitted responsive to reception by the first terminal device of a sidelink discovery request incoming from one of the one or more neighboring terminal devices; and
  controlling the periodicity of transmissions by the first terminal device of sidelink discovery requests.

2. The method of claim 1, wherein changing the periodicity comprises decreasing the periodicity responsive to the estimated achievable sidelink performance indicating a high probability of meeting the sidelink QoS requirements, or decreasing the periodicity responsive to the estimated achievable sidelink performance indicating a low probability of meeting the sidelink QoS requirements.

3. The method of claim 1, wherein the achievable sidelink performance is estimated with respect to each of two or more neighboring terminal devices, and wherein adjusting the scheduling or the priority comprises prioritizing establishment of a sidelink with a first one of the two or more neighboring terminal devices based on determining from the estimated achievable sidelink performances that there is a higher probability of satisfying the sidelink QoS requirements with the first neighboring terminal device.

4. The method of claim 1, wherein adjusting the scheduling or the priority is based on the sidelink performance information, and sidelink performance of the first terminal device.

5. A terminal device configured for deployment in a wireless network for sidelink communication, the terminal device comprising:
  radio circuitry; and
  processing circuitry configured to:
    estimate achievable sidelink performance based on sidelink performance information, the sidelink performance information including information about local radio conditions, sidelink capabilities of the terminal device, sidelink capabilities of one or more neighboring terminal devices, and sidelink Quality-of-Service (QoS) requirements; and
    adjust scheduling or priority associated with transmissions for sidelink discovery or sidelink establishment in dependence on the estimated achievable sidelink performance,
  wherein adjusting the scheduling or the priority comprises one or more of the following:
    suspending transmission of sidelink discovery messages by the terminal device, responsive to the estimated achievable sidelink performance indicating a low probability of meeting the sidelink QoS requirements;
    changing a periodicity of transmission by the terminal device of the sidelink discovery messages, in dependence on a probability of meeting the sidelink QoS requirements, as determined from the estimated achievable sidelink performance;
    suspending or postponing transmission of a sidelink discovery response by the terminal device;
    including in a sidelink discovery response transmitted by the terminal device an indication of a likelihood of meeting the sidelink QoS requirements, and wherein the indication is based on the estimated achievable sidelink performance and the sidelink discovery response is transmitted responsive to reception by the terminal device of a sidelink discovery request incoming from one of the one or more neighboring terminal devices; and
    controlling the periodicity of transmissions by the terminal device of sidelink discovery requests.

6. The terminal device of claim 5, wherein the processing circuitry is configured to adjust the scheduling or the priority based on the sidelink performance information, and sidelink performance of the terminal device.

* * * * *